United States Patent
Luther et al.

(10) Patent No.: US 11,438,312 B2
(45) Date of Patent: Sep. 6, 2022

(54) SEAMLESS CONNECTIVITY UTILIZING MULTI-DOMAIN SECURITY

(71) Applicant: Quixotic Holdings LLC, Tacoma, WA (US)

(72) Inventors: Ryan Scott Luther, Tacoma, WA (US); Anthony Samuel Jacobs, Olney, MD (US)

(73) Assignee: QUIXOTIC HOLDINGS, LLC, Fife, WA (US)

( * ) Notice: Subject to any disclaimer, the term of this patent is extended or adjusted under 35 U.S.C. 154(b) by 212 days.

(21) Appl. No.: 16/858,473

(22) Filed: Apr. 24, 2020

(65) Prior Publication Data

US 2020/0344217 A1    Oct. 29, 2020

Related U.S. Application Data

(60) Provisional application No. 62/838,891, filed on Apr. 25, 2019.

(51) Int. Cl.

| | |
|---|---|
| *H04L 29/06* | (2006.01) |
| *H04L 9/40* | (2022.01) |
| *H04W 64/00* | (2009.01) |
| *H04L 9/30* | (2006.01) |
| *H04L 9/08* | (2006.01) |

(52) U.S. Cl.
CPC ........ *H04L 63/0428* (2013.01); *H04L 9/0894* (2013.01); *H04L 9/30* (2013.01); *H04W 64/006* (2013.01)

(58) Field of Classification Search
CPC .................................................. H04L 63/0428
See application file for complete search history.

(56) References Cited

U.S. PATENT DOCUMENTS

| | | | |
|---|---|---|---|
| 7,627,121 B1* | 12/2009 | Reeds, III | H04L 9/12 380/260 |
| 10,178,509 B1 | 1/2019 | Perdew et al. | |
| 10,419,103 B1 | 9/2019 | Perdew et al. | |
| 2004/0083286 A1* | 4/2004 | Holden | G06F 21/31 709/225 |
| 2012/0239929 A1* | 9/2012 | Newman | H04L 63/083 713/168 |
| 2016/0315848 A1* | 10/2016 | Weinstein | H04L 45/16 |

OTHER PUBLICATIONS

U.S. Appl. No. 62/467,572, filed Mar. 6, 2017, 32 pages.

* cited by examiner

*Primary Examiner* — Bradley W Holder
(74) *Attorney, Agent, or Firm* — Seed IP Law Group LLP

(57) ABSTRACT

Seamless connectivity utilizing multi-domain security by storing a global key on each participant computing devices. When a participant computing device tries to connect to a network, the network sends encryption keys for that network in response to that participant computing device providing the global key and not being blacklisted. The participant computing device can then connect to the network using that network's encryption key. A meta-message container is generated for the message based on a next participant in a route from the transmitting participant to the destination participant. One or more series of one or more line items are generated for the message, with each line item being tagged tag with network information. The line items are encrypted based on the network information. The meta-message container and the encrypted series of line items are then transmitted to the next participant.

18 Claims, 12 Drawing Sheets

SEAMLESS CONNECTIVITY UTILIZING MULTI-DOMAIN SECURITY

BACKGROUND

Technical Field

The present disclosure relates generally to data transmission, and more particularly to securely transmitting data from one domain to another.

Description of the Related Art

Mobile communication devices have become a very integral part in many people's lives, and the number of mobile communication devices in use continues to grow. Today, mobile communication devices are very powerful computers that communicate with each other and with other computing devices via various different networks, data paths, and protocols. These different networks, data paths, and protocols can introduce additional processing and latency when different security mechanisms and techniques are employed along the transmission path. It is with respect to these and other considerations that the following disclosure addresses.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
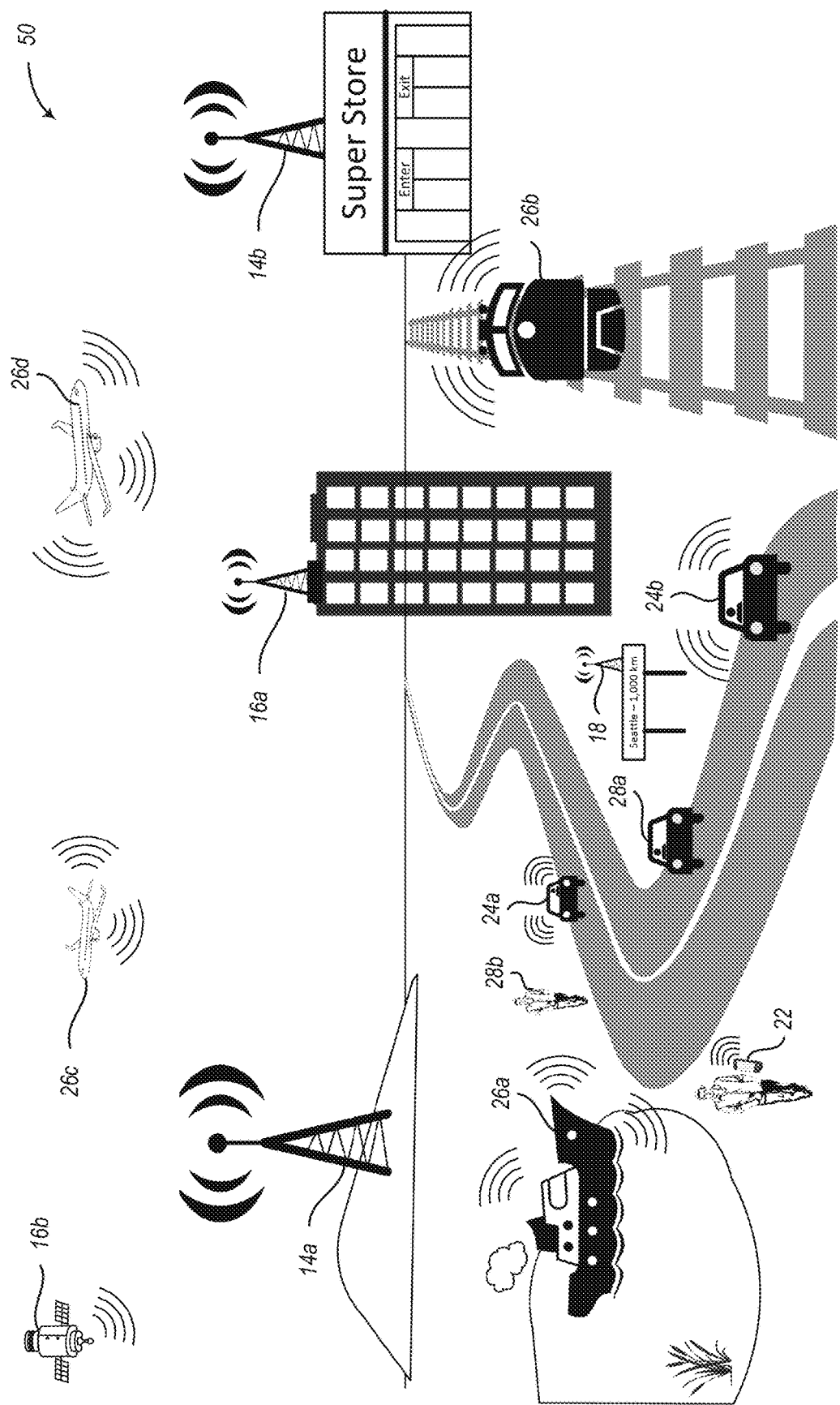
FIG. 1 illustrates a context diagram of an environment of a cognitive heterogeneous ad hoc mesh network providing seamless connectivity utilizing multi-domain security in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

As referred to herein, an "object" is a physical thing or item. Examples of objects include, but are not limited to, cars, planes, trains, boats, people, buildings, or other mobile or stationary things. Objects include participant objects and non-participant objects, which can be mobile or stationary. As referred to herein, a "participant" is an object that includes a computing device that can communicate specific, predetermined types of information and data to other participant objects via line-of-sight communications. And as referred to herein, a "non-participant" is an object that does not include a computing device that can communicate the same specific, predetermined types of information and data with a participant object. As discussed in more detail herein, participants can be mobile or stationary and may include computing devices of different sizes having different computing or networking capabilities. Throughout this disclosure, the term "participant" is used interchangeably with "participant object" and "participant computing device" and other related variations, and the term "non-participant" is used interchangeably with "non-participant object" and other related variations.

As referred to herein, "line-of-sight communication" refers to wireless transmission of information from a participant to another participant without other retransmission devices. Accordingly, line-of-sight is the maximum range one participant can communicate wirelessly with another participant without significant data loss. Examples of wireless transmissions used in line-of-sight communications include Bluetooth, Wi-Fi, ADSB, TCAS, or other protocols now known or developed in the future. In some embodiments, all communications between participants utilize a common protocol.

As referred to herein, "sensor" refers to a participant's utilization of line-of-sight communications to transmit information to another participant or to detect another participant or non-participant object. For example, the sensor may include a transmitter that transmits notification signals or other data via line-of-sight communications to another participant. Notification signals are radio signals that are broadcast or directionally transmitted from a participant to send information to other participants that are within line-of-sight of the transmitting participant. As one example, notification signals may include the participant's identification information, geolocation, kinematic information, throughput capabilities, frequency capabilities, encryption capabilities, subnets in which it is a member, and other information regarding the participant. The sensor can also transmit data signals to other participants. Data signals are radio signals that are broadcast or directionally transmitted from a participant to another participant or computing device to send or forward messages or data packets between participants and computing devices that are in line-of-sight communication with the transmitting participant. The sensor may also include a receiver that receives echo signals of the transmitted notification signals. These echoed notification signals can be utilized to determine a location of an object, which is described in more detail in U.S. patent application Ser. No. 15/892,259, filed Feb. 8, 2018 and issued as U.S. Pat. No. 10,178,509 on Jan. 8, 2019, which is herein incorporated by reference.

Sensors also include beam forming techniques and technologies that enable the sensor to transmit data to or detect objects in a specific sensor coverage area. This specific sensor coverage area is determined based on the beamwidth of the sensor transmissions and a threshold line-of-sight distance of such transmissions. The threshold line-of-sight distance may be determined based on the distance away from the transmission where data loss exceeds a predetermined threshold amount, which may be based on the type of transmitter utilized, power utilization, antenna capabilities, frequency, etc. Sensors may beam form in two dimensions away from a participant or in three dimensions away from the participant. In this way, sensors can be configured to transmit data or detect objects in a specific coverage area next to, in front of, behind, above, or below the participant, or a combination thereof.

Various embodiments described herein provide a lightweight encryption for unified domain entry (e.g., unified network entry) of participants. In some embodiments, each participant may be a member of a universal service-level agreement to identify which computing devices are participants of the unified domain, which allows for participants to communicate with one another without having to get user authorization for each individual connection between participants. Participants can be members of one or more domains. Each domain may be a different, unique, or separate network, encryption mechanism, security level, classification, releasability, etc. A domain may be defined by an identifier and a set of encryption parameters.

Participants may include mobile or stationary participants. Mobile participants may include smaller, low power, low transmission mobile computing or Internet-Of-Things devices; medium power, medium transmission, power regenerating mobile computing devices; or larger, high power, high transmission mobile computing devices. Examples of mobile participants may include, but are not limited to, mobile phones, laptop computers, tablet computers, wearable computing devices, automobile computing devices, small personal boat computing devices, personal aircraft computing devices, commercial airline plane computing devices, semi-truck computing devices, cargo ship computing devices, train computing devices, etc.

Stationary participants can likewise include low power, low transmission stationary computing devices; medium power, medium transmission, power regenerating stationary computing devices; or larger, high power, high transmission mobile computing devices. The locations of stationary participants may include, but are not limited to, cellular towers, airports, large retail or superstores, restaurants and coffee shops, airfields and train stations, satellites, road intersections, train crossings, road signs, mile markers, crosswalks, etc.

Communications sent from or received by a participant over the unified domain may be restricted within a particular network, sub-network, or security classification. For example, communications sent from a military participant may have a first level of restriction classification (e.g., high security), a police department participant may have a second level of restriction classification (e.g., medium security), and a civilian participant may have a third level of restriction classification (e.g., low security). More or fewer levels of restriction classification may be employed. Similarly, one or more levels of restriction classification may be employed within a same group of participants. For example, one portion of a group of participants (e.g., police captains) may have a higher restriction classification than a second portion of the group of participants (e.g., police deputies).

Each participant has software or hardware, or a combination thereof, that includes a global encryption key. The global encryption key is used by each participant to enter the unified domain. The unified domain is restricted by a set of cryptographic certificate authorities known to participants, which is maintained and updated from time to time. Subdomains or sub-networks are issued by a global network certificate authority and may include permissions to operate as a subnet certificate authority using a certificate chain of trust that leads back to the global authority. The top-level certificate authority may be signed with traditional public-private key cryptography. The public keys are known and advertised on the network itself for a regular and periodic refresh and expiration interval. The global network can then be signed with the top-level authority, forming a chain of trust, where subnetworks provide additional layers of encryption.

New domains or networks may be created on an ad hoc basis when needed by one or more participants. A participant can create a new domain as long as the parent domain, e.g., a global network or a subnetwork, has the authority to issue cryptographic keys and parameters. In some embodiments, a participant having authority to issue cryptographic keys and parameters may delegate its authority to other trusted participants. These trusted participants can also issue cryptographic keys and parameters a new ad hoc domain or to an existing domain, which can improve the efficiency and thoroughness of deploying a new domain. In various embodiments, the trusted participants are authorized to pass on or update cryptographic keys and parameters to other participants at the trusted participant's security level. In some embodiments, a pairwise encryption scheme is used to avoid transferring private keys over an encryption layer providing higher or global access.

In various embodiments, smart cities, which may include stationary or mobile participants, have a crypto key that is sent Over-The-Air (OTA) to participants that are trying to connect to the unified network and are not blacklisted. If a smart city router detects a participant that has a global crypto key and not a city key, then the router sends the city key to the participant. The participant then seamlessly joins the smart city network. In various embodiments, tunnels can be created to access home, office, or restricted information from approved participants or approved networks.

In some embodiments, the global encryption key can also be employed to access city, home, or office secure networks depending on the installation. Each participant also has stored thereon an encryption key for each specific domain or restriction classification from which it is a member or can access. For example, a police department participant would contain the Police key, the City key and the global key so that the police department participant could access the unified network from anywhere, anytime. The keys stored on each participant are also stored or identified on an approved list that activates the key.

Messages sent from one participant (e.g., a transmitting participant) to another participant (e.g., a destination participant or a next participant in route to the destination participant) are encrypted for the unified network and used to "wrap" disparate protocols, which allows the messages to pass through or be translated on non-traditional networks/spectrum.

In various embodiments, each line item of a message is flagged or tagged with metadata or other network information to mark the corresponding line item's level of releasability or classification. This metadata or network information is utilized by the recipient participant to obtain or identify the corresponding line item's that match the domain or level of releasability or classification of the recipient using the recipient's stored decryption mechanism or keys.

As one example, a coastal port may support participants associated with the Department of Homeland Security, the Port Authority, Coast Guard, Navy, Air Force, local law enforcement, and civilians. If an incident (e.g., a safety violation or security breach) were to occur at the port, participants from these different groups may have information that should be shared with one another. Unfortunately, due to security clearances and other secure protocols, participants within these different groups generally cannot communicate with participants of another group using their traditional protocols. Similarly, with Posse Comitatus, law enforcement and military classified information cannot be shared between all participants. With each message being line itemed for classification as discussed herein, and used by the participants, it allows for all available information to be shared, correlated, and fused based on the stored keys, which allows for government, civilian, and commercial networks to be integrated into a single seamless architecture or unified network.

In some embodiments, message transmissions sent by participants are separated into packets. These packets serve three purposes: 1) it can allow the different levels of releasability/classification to be grouped together in packets (e.g., the line items in a message for one level of releasability may be aggregated into one or more grouped packets and line items for a different level of releasability may be aggregated into one or more other grouped packets); 2) it can allow the participant (or intervening participants along the transmission path) to multipath the message through a mesh network of participants making it faster and more resilient; and 3) it can create smaller chunks of transmitted data that can act like radar pulses allowing for line-of-sight object detection and tracking (e.g., using U.S. patent application Ser. No. 15/913,612, filed Mar. 6, 2018, entitled "Cognitive Heterogeneous Ad Hoc Mesh Network," which is incorporated herein by reference in its entirety). Moreover, depending on the level of security required between participants, the network socket can also be encrypted when connecting to the internet.

FIG. 1 illustrates a context diagram of an environment of a cognitive heterogeneous ad hoc mesh network providing seamless connectivity utilizing multi-domain security in accordance with embodiments described herein. Environment 50 includes a plurality of mobile participants (collectively referred to elsewhere herein as mobile participant computing devices 36), a plurality of stationary participants (collectively referred to elsewhere herein as stationary participant computing devices 34), and a plurality of non-participants (e.g., object 28a-28b). As mentioned above, the participants can communicate specific types of information or data with one another as part of a cognitive heterogenous ad hoc mesh network, and may or may not communicate the same types of information with the non-participants who are not part of the network.

Briefly, each participant utilizes multi-domain security to transmit information from one participant to another participant. In general, utilization of multi-domain security refers to the transmission of messages between participants where the participants may be on different networks or utilize different encryption mechanisms or be subject to different security levels. Each message includes a meta-message container indicating where the message is to be transmitted and one or more encrypted and tagged line items or sub-messages that include system information (e.g., information in notification signals) or payload information (e.g., information in data signals).

Participants can employ one or more sensors to communicate with other participants or to detect objects in the vicinity of the participant, while using the multi-domain security mechanisms described herein. A computing device, such as one or more of the mobile participants, a stationary participant, or a server computer or system may track participants and objects by utilizing echoes of self-transmitted notification signals or reflection signals of other participant notification signals. In this way, participants can track objects and transmit data and tracking information to other participants. Use of the multi-domain security described herein enables participants on disparate networks or using different encryption mechanisms to communicate with one another or to ensure authenticity of notification signals.

The following is a general discussion of the types of participants that may be utilized in such an environment and system. Embodiments, however, are not limited to these particular participants and combinations of participants.

The plurality of mobile participants includes tier 1 mobile participants 22, tier 2 mobile participants 24, and tier 3 mobile participants 26. The three tiers of mobile participants are generally separated by the computing and networking capabilities of the computing devices associated with the mobile participant. The computing and networking capabilities may be limited or determined by the amount of power available or utilized by a mobile computing device, the amount of processing power available, or the size, type, or accuracy of the antenna utilized, etc.

For example, tier 1 mobile participants 22 typically have the smallest available power, lowest processing power, smallest bandwidth, shortest ranged antenna, lowest power output, lowest accuracy, and slowest update rate. Examples of tier 1 mobile participants 22 include, but are not limited to, mobile phones, laptop computers, tablet computers, wearable computing devices, or other smaller, low power, low transmission mobile computing or Internet-Of-Things devices. In the example illustrated in FIG. 1, there is only a single tier 1 mobile participant 22, which happens to be a mobile phone in this example. However, other numbers and types of tier 1 mobile participants 22 may also be employed.

Tier 2 mobile participants 24 typically have medium power constraints, a medium amount of processing power, medium bandwidth, medium range capabilities, medium accuracy, and medium update rate. Examples of tier 2 mobile participants 24 include, but are not limited to, automobiles, small personal boats, personal aircrafts, or other medium power, medium transmission, power regenerating mobile computing devices or objects that can support such mobile computing devices. FIG. 1 illustrates example tier 2 mobile participants 24 as including automobiles 24a and 24b. However, other numbers and types of tier 2 mobile participants 24 may also be employed.

Tier 3 mobile participants 26 typically have the largest available power, highest processing power, highest bandwidth, longest transmit and receive capabilities, highest accuracy, and fastest update rate among mobile participant computing devices. Example tier 3 mobile participants 26 include, but are not limited to, commercial airline planes, semi-trucks, cargo ships, trains, or other objects that can support larger, high power, high transmission mobile computing devices or objects that can support such mobile computing devices. FIG. 1 illustrates example tier 3 mobile participants 26 as including boat 26a, train 26b, and airplanes 26c and 26d. However, other numbers and types of tier 3 mobile participants 26 may also be employed.

Various embodiments described herein refer to mobile aerial participants or mobile ground participants. Mobile aerial participants and mobile ground participants are mobile participants. Thus, mobile aerial participants and mobile ground participants may likewise be separated into the three-tiers of participant capabilities.

For example, tier 1 mobile aerial participants may include personal computing devices that are onboard an airplane, such as user devices; tier 2 mobile aerial participants may include general aviation aircraft; and tier 3 mobile aerial participants may include cargo aircraft and commercial aircraft. Tier 1 mobile ground participants may include personal computing devices that are on a person walking down the street or on a car or in a boat; tier 2 mobile ground participants may include automobiles or recreational watercraft; and tier 3 mobile ground participants may include semi-trucks and cargo ships.

In some embodiments, one or more of these tiers may be further separated by capabilities or expected utilization. For example, tier 3 mobile aerial participants may include tier 3A mobile aerial participants that include cargo aircraft and tier 3B mobile aerial participants that include commercial aircraft. One situation where this distinction may occur is where a commercial aircraft is handling a lot of data requests from user devices onboard the aircraft (e.g., tier 1 mobile aerial participants), which may impact that aircraft's throughput for forwarding communications between other participants. Conversely, a cargo aircraft is typically not handling a lot of data requests from user devices onboard the aircraft, but is instead primarily being used to forward communications between other participants.

Although some embodiments may be described herein with respect to mobile aerial participants, embodiments are not so limited. Those same embodiments may instead utilize mobile ground participants or a combination of mobile ground participants and mobile aerial participants, unless the context clearly indicates otherwise.

The plurality of stationary participants includes ground entry points 14, remote entry points 16, and access nodes 18. In some embodiments, stationary participants may be referred to as ground participants. Similar to the three tiers of mobile participants, the ground entry points 14, remote entry points 16, and access nodes 18 are generally separated by computing and networking capabilities, and footprint size in some embodiments.

For example, ground entry points 14 typically have the largest available power, highest processing power, highest bandwidth, and longest range antenna capabilities. Example locations of ground entry points 14 include, but are not limited to, cellular towers, airports, large retail or superstores, or other locations that can support large sized, high power, high transmission stationary computing devices. FIG. 1A illustrates example ground entry points 14 as including tower antenna 14a and superstore 14b. However, other numbers and types of ground entry points 14 may also be employed.

Remote entry points 16 typically have medium power constraints, a medium amount of processing power, medium bandwidth, and medium range capabilities. Example locations of remote entry points 16 include, but are not limited to, restaurants and coffee shops, airfields and train stations, satellites, or other locations that can support medium sized, medium power, medium transmission stationary computing devices. FIG. 1A illustrates example remote entry points 16 as including store antenna 16a and satellite 16b. However, other numbers and types of remote entry points 16 may also be employed.

Access nodes 18 typically have the smallest available power, lowest processing power, lowest bandwidth, and shortest range antenna capabilities of the stationary participants. Example locations of access nodes 18 include, but are not limited to, road intersections, train crossings, road signs, mile markers, crosswalks, or other locations that can support smaller, low power, low transmission stationary computing devices. In the example illustrated in FIG. 1A, there is only a single access node 18, which happens to be a road sign in this example. However, other numbers and types of access nodes 18 may also be employed.

As mentioned herein, mobile and stationary participants can communicate with one another to pass information from one participant to another. Although in some embodiments, mobile participants may communicate with one another without the use of stationary participants.

Figure 2A:
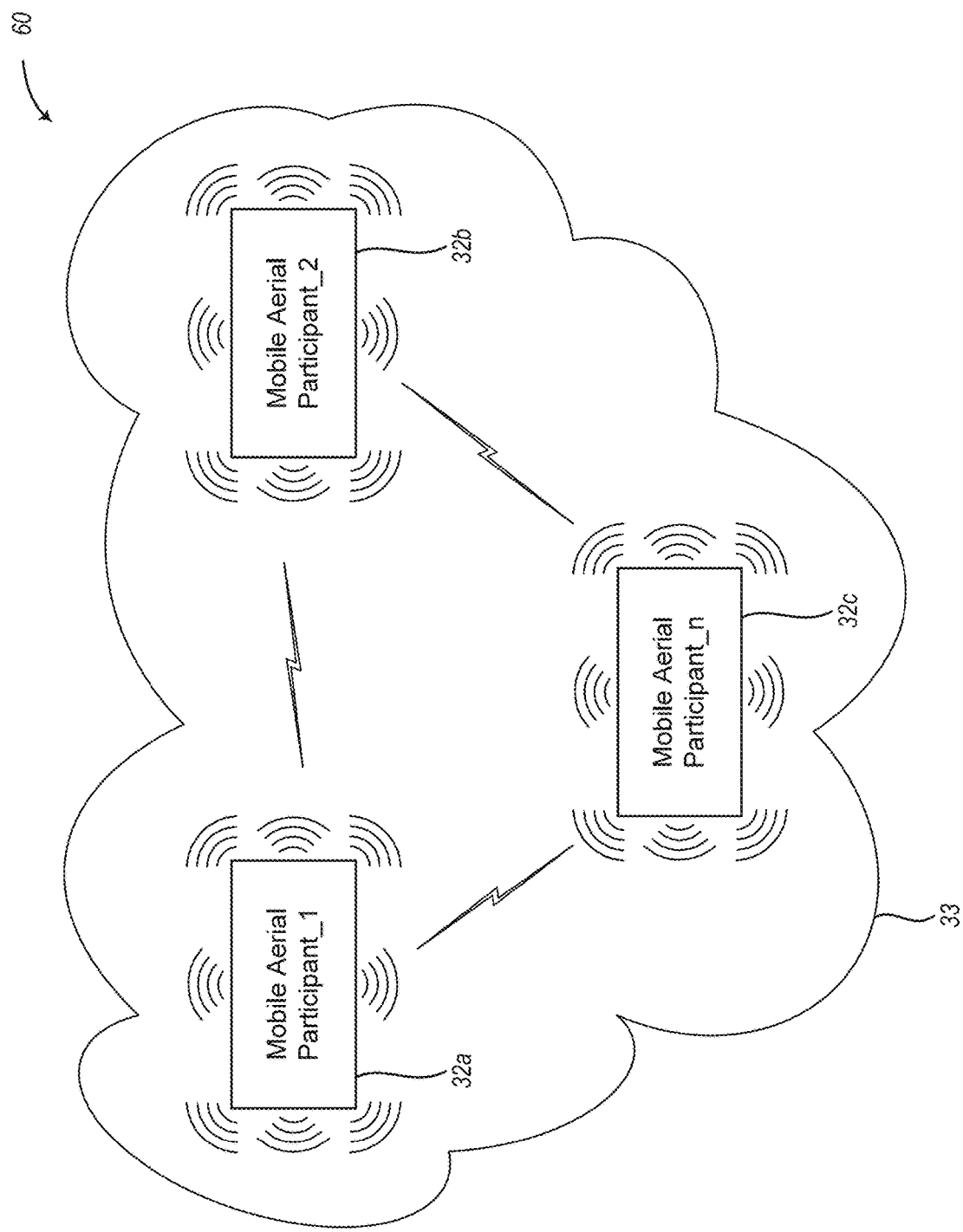
FIGS. 2A and 2B illustrate a block diagram of a communication network between participants in accordance with various embodiments described herein.
Figure 2B:
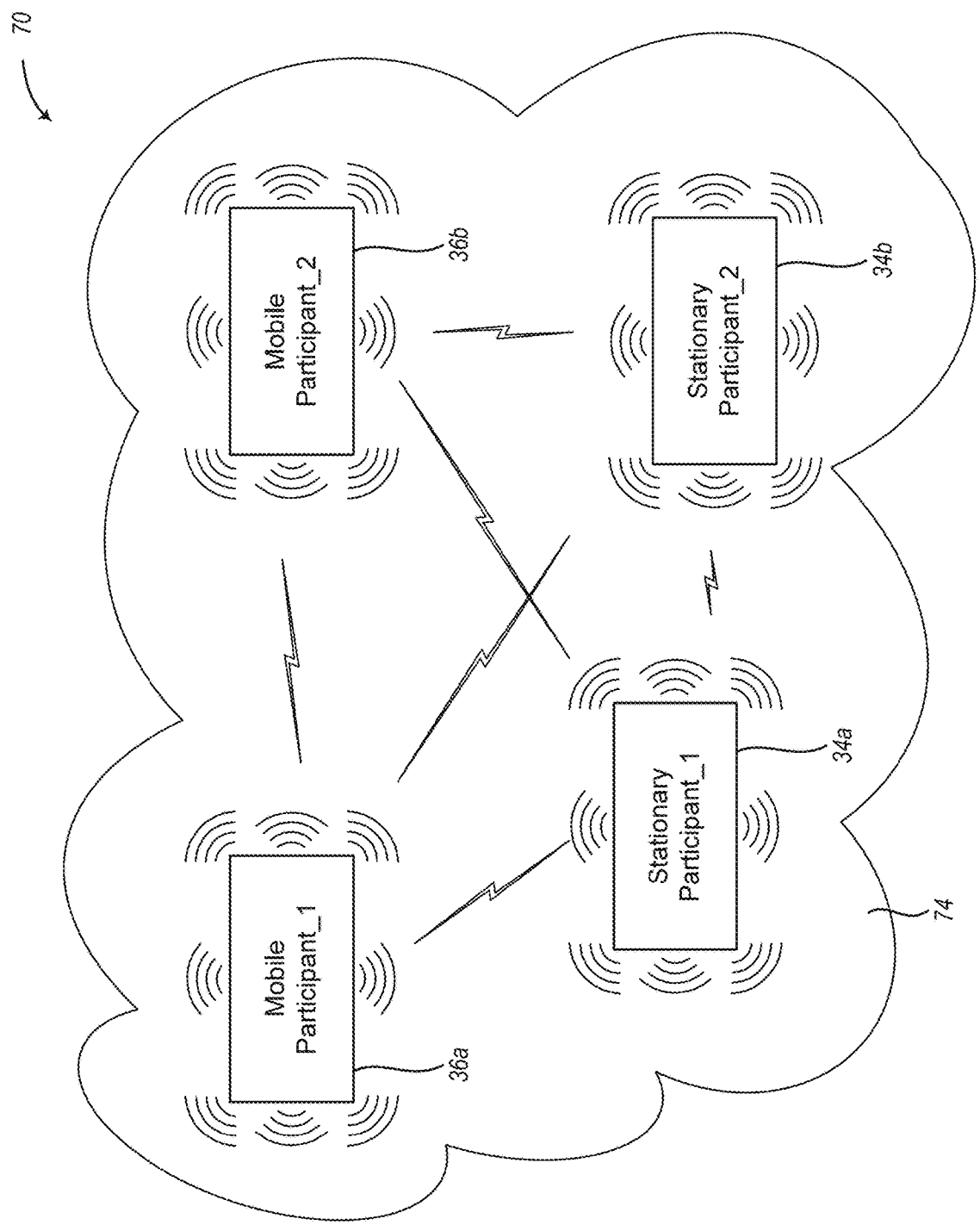

FIGS. 2A and 2B illustrate block diagrams of a communication network between participants in accordance with various embodiments described herein. FIG. 2A illustrates an example 60 of a communication network 33 between a plurality of mobile aerial participants 32a-32c. Collectively, the mobile aerial participants 32a-32c may be referred to as the network. Although FIG. 2 only illustrates three mobile aerial participants as creating network 33, embodiments are not so limited and one or a plurality of mobile aerial participants may be employed. Similarly, the network 33 may be established from other types of mobile participants, including various combinations of tier 1 mobile participants, tier 2 mobile participants, or tier 3 mobile participants, which perform many of the same functions as the mobile aerial participants.

Each mobile aerial participant 32a-32c transmits radio frequency signals to be received by other mobile aerial participants 32 that are within line-of-sight of the sending mobile aerial participant 32. These signals include, but are not limited to (1) data signals that transmit messages or data to another participant and (2) notification signals that provide identification information regarding the sending mobile participant. In some embodiments, the notification signals are referred to as self-reporting messages or self-reporting signals. The notification signals can include one or both of notification signals for networking and routing among participants and notification signals for safety and de-confliction of possible threats.

The notification signals serve four primary simultaneous purposes: (1) to notify other participants of the sending participant's identity, position, and kinematic information; (2) to detect and track non-participant objects; (3) to establish routing and network efficiencies (i.e., to create the participant table identifying where each participant is and with who they are in line-of-sight communication); and (4) to encrypt and encapsulate various payloads, protocols, or encryption of the payload. In various embodiments, the notification signals provide individualized information regarding the sending mobile aerial participant 32 so that other mobile aerial participants 32 know that they are within line-of-sight communication of the sending mobile aerial participant 32 within network 33. These notification signals may be referred to as self-reporting signals, since the mobile aerial participant 32 is independently reporting its position and kinematic information to any other mobile aerial participants 32 that are within line-of-sight of the transmitting mobile aerial participant 32 without being prompted or requested by another mobile (or stationary) participant. The mobile aerial participants 32 utilize the notification signals to generate a participant table that is utilized to transmit data signals between the mobile aerial participants 32.

Notification signals are encrypted using the multi-level domain security described in more detail herein. For example, notification signals include a meta-message container and one or more line items. The meta-message container includes basic transmission information and the line items are encrypted and tagged to be accessed by participants in the network. In various embodiments, the information in the notification signal may include the mobile aerial participant's 32 identification information, geolocation, kinematic information, attitude information, throughput capabilities, frequency capabilities, number and capability of sensors, and other information. In various embodiments, the notification signals may also include transmission time information that allows for Time Distance of Arrival (TDOA) and Time of Flight (TOF) or Round Trip Timing (RTT) calculations.

The geolocation of the mobile aerial participant 32 may be determined via traditional methods like GPS sensors or modules, cell tower or stationary participant signal triangulation, or via notification messages from other devices or participants that know or estimate the position or location of the mobile aerial participant 32. This can be accomplished with extreme accuracy and minimal latency when notification messages are echoed and supported by stationary participants. The geolocation may also be referred to as the position or location of the mobile aerial participant 32.

The kinematic information may be obtained by monitoring the mobile aerial participant's 32 position and identifying changes over time, utilizing various sensors to calculate or determine the kinematic information, or obtaining it from another system.

The attitude information may be obtained from the electronics or flight controls or sensors of the mobile aerial participant 32. The attitude information may include yaw, pitch, roll, and sensitivity parameters of each.

The frequency capabilities of the mobile aerial participant 32 may be predetermined based on the type of hardware utilized by the mobile aerial participant 32. For example, the hardware of the mobile aerial participant 32 may be designed to utilize ACARS, IEEE 802.11 standards, or some other wireless transmission frequencies or standards, which defines the frequency capabilities of the mobile aerial participant 32. In other embodiments, the frequency capabilities may be predetermined based on government regulations regarding available frequencies. In yet other embodiments, the frequency capabilities may be defined by a user or administrator.

The throughput may be predetermined based on the type of hardware utilized by the mobile aerial participant 32 or on the current processing capacity or network traffic of the mobile aerial participant 32 or a number of other factors. For example, if the mobile aerial participant 32 is a Boeing 737-700 then it may have more throughput capabilities than a Boeing 777-200ER because the Boeing 737-700 may have less passengers and thus may be supporting fewer data requests from user devices onboard the airplane, which can allow for more possessing power to be directed towards forwarding communications between other participants.

The number and capability of sensors may identify the type of sensors, where their particular antennas are attached to the participant, the range/transmission capabilities of the sensors, their beamwidth characteristics, power levels, or other information regarding the sensors on the corresponding participant.

Notification signals are transmitted via directional broadcast beams. In various embodiments, directional notification signals may be transmitted in a sequential or non-sequential 360-degree pattern, so that the notification signal is transmitting in all directions surrounding the participant. In some embodiments, where there is little to no sensor overlap, the notification signals may be transmitted using directional or non-directional broadcast signals. In general, the use of the term "broadcast" herein refers to the transmission of a signal by a sending participant without being requested by another participant and does not have a specific participant as a destination.

Use of directional transmissions can reduce the amount of power needed to transmit the notification signal or other communication to another participant, while also providing additional versatility in providing additional sensor coverage by at least one sensor on at least one participant in an area. Moreover, the use of directional transmissions enables the sending participant to use just enough power to ensure it gets to its intended target. Additionally, directional transmissions can reduce interference between transmissions in a congested space as well as make transmissions more secure.

The notification signal may be broadcast periodically, at predetermined times, dynamically selected based on number and proximity of other mobile aerial participants, or at a given dynamically changing update rate. In some embodiments, the rate at which the mobile aerial participant 32 transmits its notification signal may change based on a combination of the distance, closure velocity, and closing angles between the sending mobile aerial participant 32 and other mobile aerial participants 32 within line-of-sight of the sending mobile aerial participant 32.

The mobile aerial participants 32a-32c transmit notification signals to inform other mobile aerial participants 32 of their position and movement. For example, mobile aerial participant 32a transmits notification signals with information identifying itself and its respective geolocation and kinematic information without regard to the presence or location of mobile aerial participants 32b or 32c. If mobile aerial participant 32c is within line-of-sight of mobile aerial participant 32a, mobile aerial participant 32c receives the transmitted notification signals from mobile aerial participant 32a and utilizes the information in the notification signals, and its own location and kinematic information, to identify the position and movement of mobile aerial participant 32a relative to itself.

The mobile aerial participants 32 can utilize the notification signals to track other participants and non-participants (e.g., by using echo signals of the notification signals to locate objects) and to create and update the participant table to identify which participants are in network 33, their location, their capabilities, and who they are in line-of-sight communication. The various communications between the mobile aerial participants 32a-32c create a communication network 33 among each other that enables them to communicate with one another without the use of another communication backbone, such as a cellular tower network.

The data signals transmitted by one participant to another participant may be transmitted via directional transmission beams or non-directional transmission signals. In various embodiments, the sending mobile aerial participant 32 utilizes a participant table to determine a location of the recipient participant. The sending mobile aerial participant 32 can directionally focus the transmitted data signals towards the recipient participant based on the position of the sending participant and the position of the recipient participant. The use of directional transmissions can reduce power consumption and increase the range in which transmission can be received, while also reducing interference between transmissions in a congested space.

The data signals may be the fusion or combination of payload data and a self-reporting message (similar to the information provided in a notification signal). In various embodiments, data signals may include one or more encrypted and tagged line items that include zero or more self-reporting information (e.g., system information) and zero or more line items that include payload data. The size of each data signal may be variable and may dynamically change based on current network bandwidth, individual participant bandwidth, requests for more or less information, requests for higher or lower fidelity tracking of participants or objects, etc. Dynamically changing the size of a data signal includes dynamically changing the number of line items in the message.

In some embodiments, the amount of payload data may be increased or decreased to accommodate changes in the size of the data signals. In other embodiments, the amount of information in the self-reporting message portion may be increased or decreased to accommodate changes in the size of the data signals. In yet other embodiments, different combinations of increases or decreases to the payload data or the self-reporting message portion may be utilized. In various embodiments, other characteristics of the data signals may be dynamically modified, including changing the pulse width of the transmission beam, changing the energy on the destination participant, etc.

The data signals (or the notification signals) may be further packetized for additional security and ease of transmission (e.g., VOIP or other packetized data-driven services). The data or a portion of the data of each packet may be utilized as a thumbprint of each individual packet. For example, in some embodiments, each packet may include one or more beam characteristics used to transmit the data signal. These beam characteristics can be compared for subsequent packets to determine if the packets originated from the same participant. Similar comparisons of subsequent packets can be performed on other data included in a notification signal (geolocation, kinematic information, attitude information, throughput capabilities, frequency capabilities, number and capability of sensors, etc.).

FIG. 2B illustrates and example 70 of a communication network 74 that includes a combination of stationary participants 34 and mobile participants 36. Example 70 is similar to example 60 in FIG. 2A, but includes a first mobile participant 36a, a second mobile participant 36b, a first stationary participant 34a, and a second stationary participant 34b. Each mobile participant 36 and stationary participant 34 transmits radio frequency signals to be received by other participants, whether stationary or mobile, that are within line-of-sight of the sending participant.

Similar to what is described above in conjunction with FIG. 2A, these signals include, but are not limited to (1) data signals that transmit messages or data to another participant and (2) notification signals that provide personalized information regarding the sending mobile participant. Briefly, the notification signals may be used to inform other participants of the transmitting participant's position and movement and may be used by the transmitting participant, or other participants, to track objects, as discussed herein. The data signals may be used to transmit payload information from one participant to another, whether directly or via one or more intermediate participants. The notification signals and data signals are encrypted using the multi-level domain security described in more detail herein.

The communication network can contain may other combinations of mobile participants and stationary participants beyond those shown in FIGS. 2A and 2B. Such networks may also perform similar actions as described above to identify and track mobile participants that are in line-of-sight to support management of the participant table and to communicate data or information amongst themselves to increase accuracy and efficiency of each participant.

FIGS. 3A-3F illustrate block diagrams showing use-case examples of messages employing multi-domain security in accordance with embodiments described herein. Examples, 100A, 100B, 100C, 100D, 100E, and 100F in FIGS. 3A-3F, respectively, are for conceptual and illustrative purposes and should not be considered exhaustive or limiting.

Figure 3A:
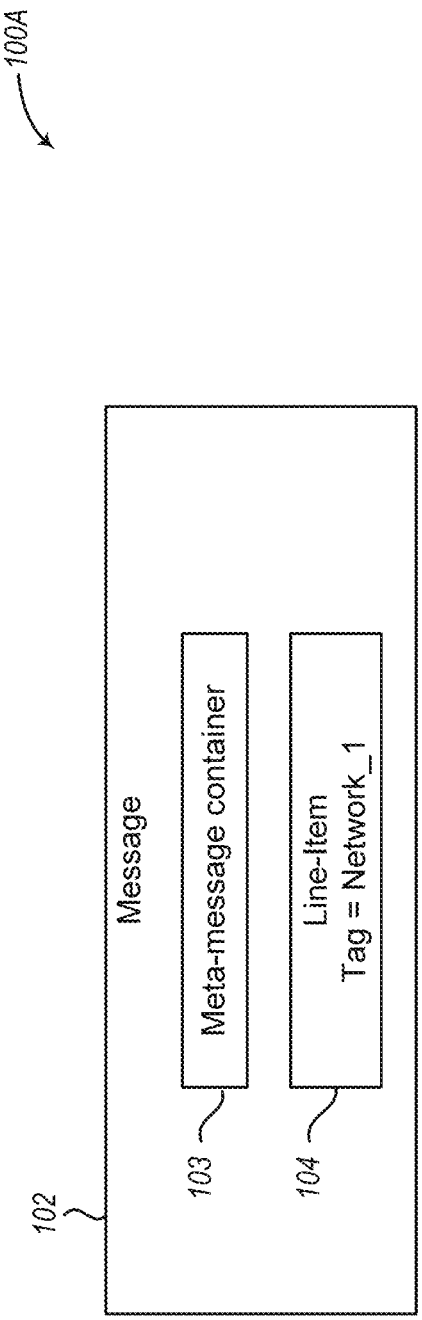
FIGS. 3A-3F illustrate block diagrams showing use-case examples of messages employing multi-domain security in accordance with embodiments described herein.

Example 100A in FIG. 3A illustrates message 102 as including a meta-message container 103 and a line item 104. The meta-message container 103 is considered to be a wrapper for the message or line item 104. The meta-message container 103 identifies the subnet in which the line item 104 in the message 102 is to be transmitted. A routing manager can then utilize the identified subnet to determine a best path and next participant to get the message to the destination participant. In some embodiments, the meta-message container 103 may identify the next participant in the transmission or routing of the message 102 to the destination participant.

Line item 104 is tagged with network information, which in this example is for access by participants of "network_1." The network information indicates how the corresponding line item is to be encrypted, which participants can access the information included in the line item, or a level of releasability or classification of the information.

As discussed herein, line item 104 may include system information or payload information. If the message 102 is a notification signal, then the line item 104 may only include system information of the transmitting participant. If the message 102 is a data signal, then the line item 104 may include payload information or a combination of system information and payload information.

Figure 3B:
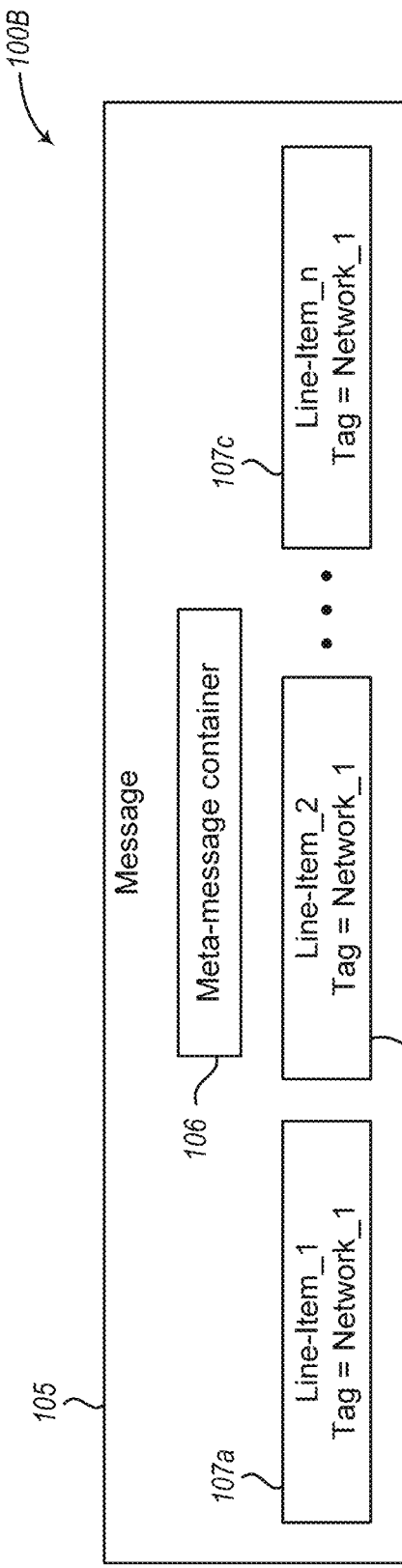

Example 100B in FIG. 3B is similar to Example 100A in FIG. 3A, but illustrates a message 105 as including a meta-message container 106 and one or more line items 107a-107c. The meta-message container 106 is considered to be a wrapper for the message or line items 107a-107c. The meta-message container 106 may be an embodiment of meta-message container 103 in FIG. 3A and identifies the subnet in which the line items 107a-107c in the message 105 are to be transmitted.

Each line item 107a-107c is tagged with network information, which in this example is for access by participants of "network_1." As noted above, the network information indicates how the corresponding line item is to be encrypted, which participants can access the information included in the line item, or a level of releasability or classification of the information. In this example, all line items 107a-107c in the message 105 include a same tag, and are thus similarly encrypted.

As discussed herein, each line item 107a-107c may include system information or payload information. If the message 105 is a notification signal, then the line items 107a-107c may only include system information of the transmitting participant. If the message 105 is a data signal, then the line items 107a-107c may include a combination of system information and payload information.

Figure 3C:
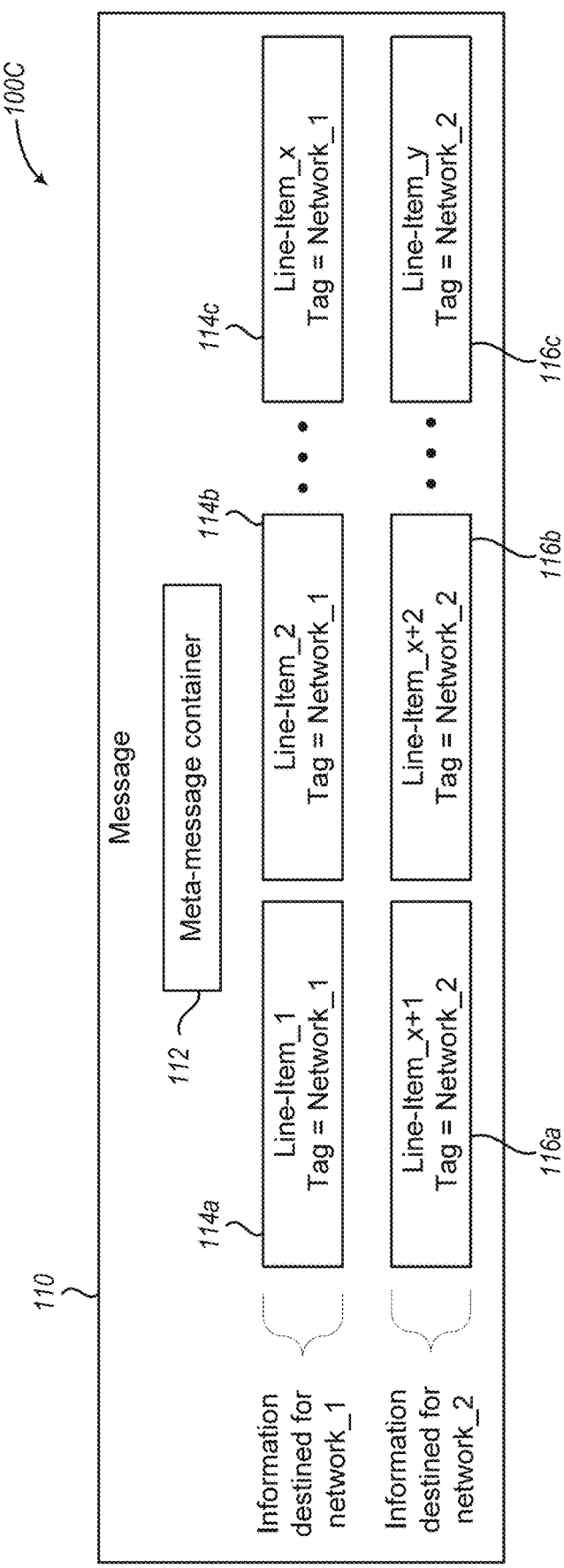
Figure 3D:
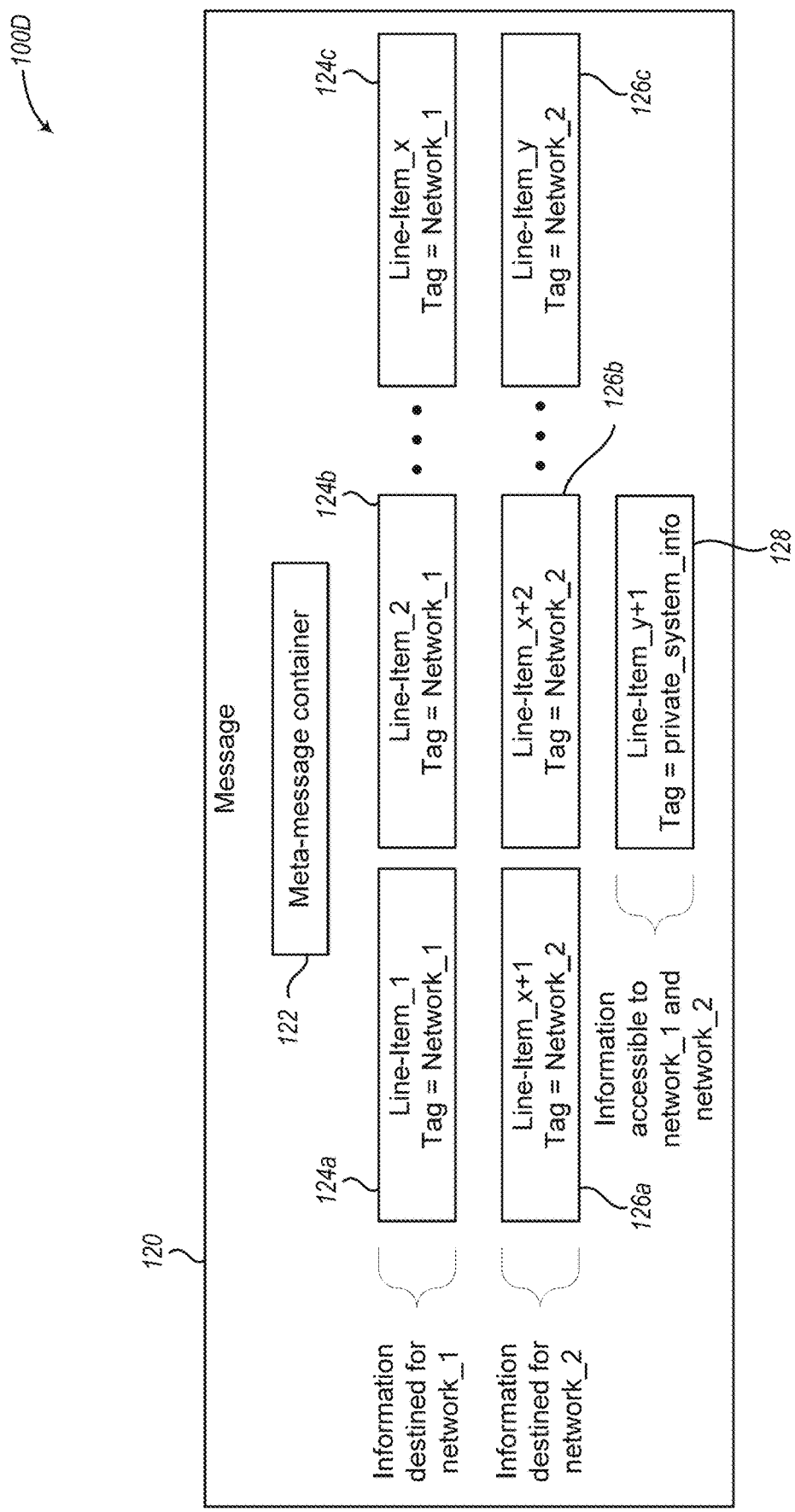
Figure 3E:
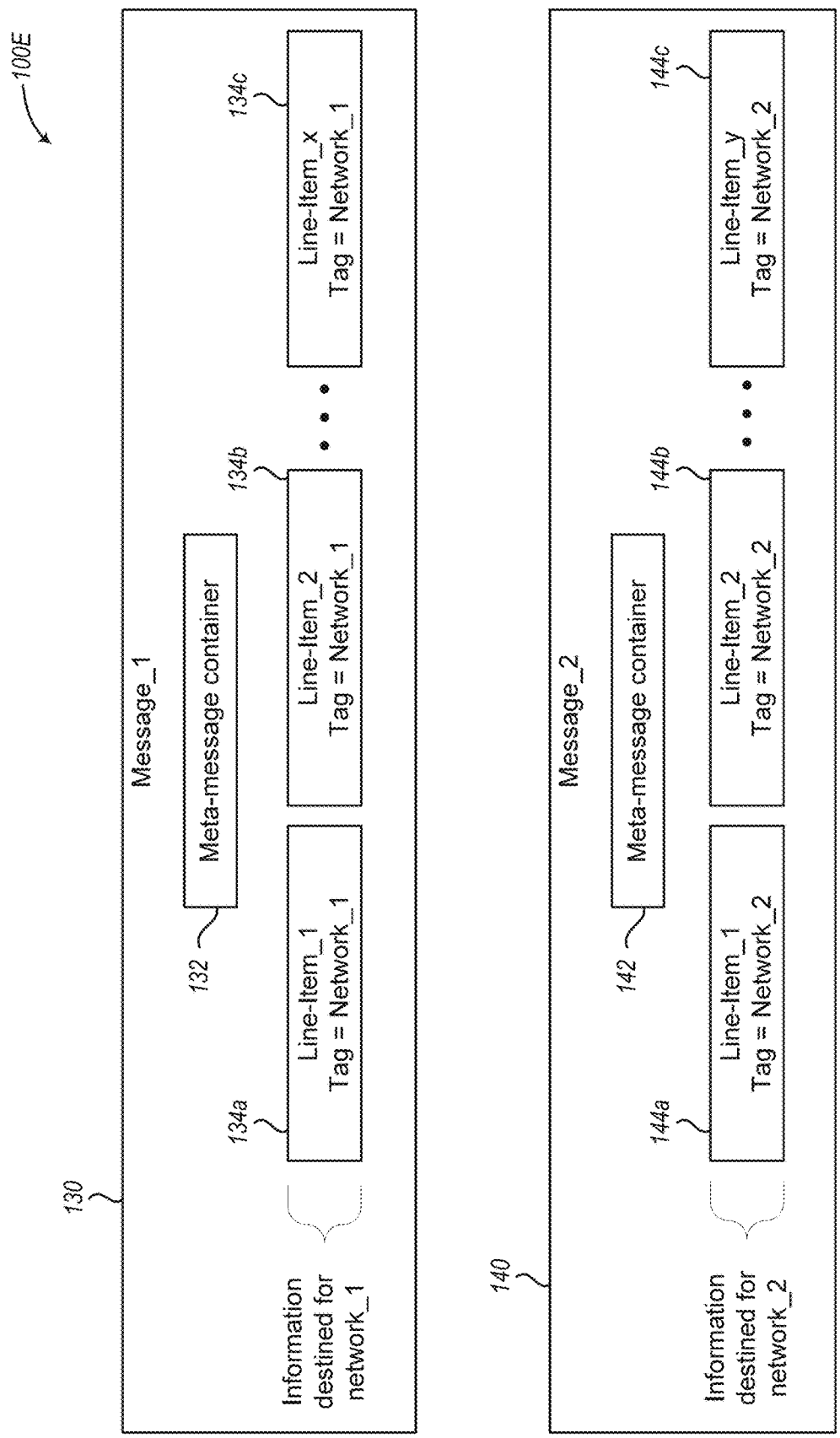
Figure 3F:
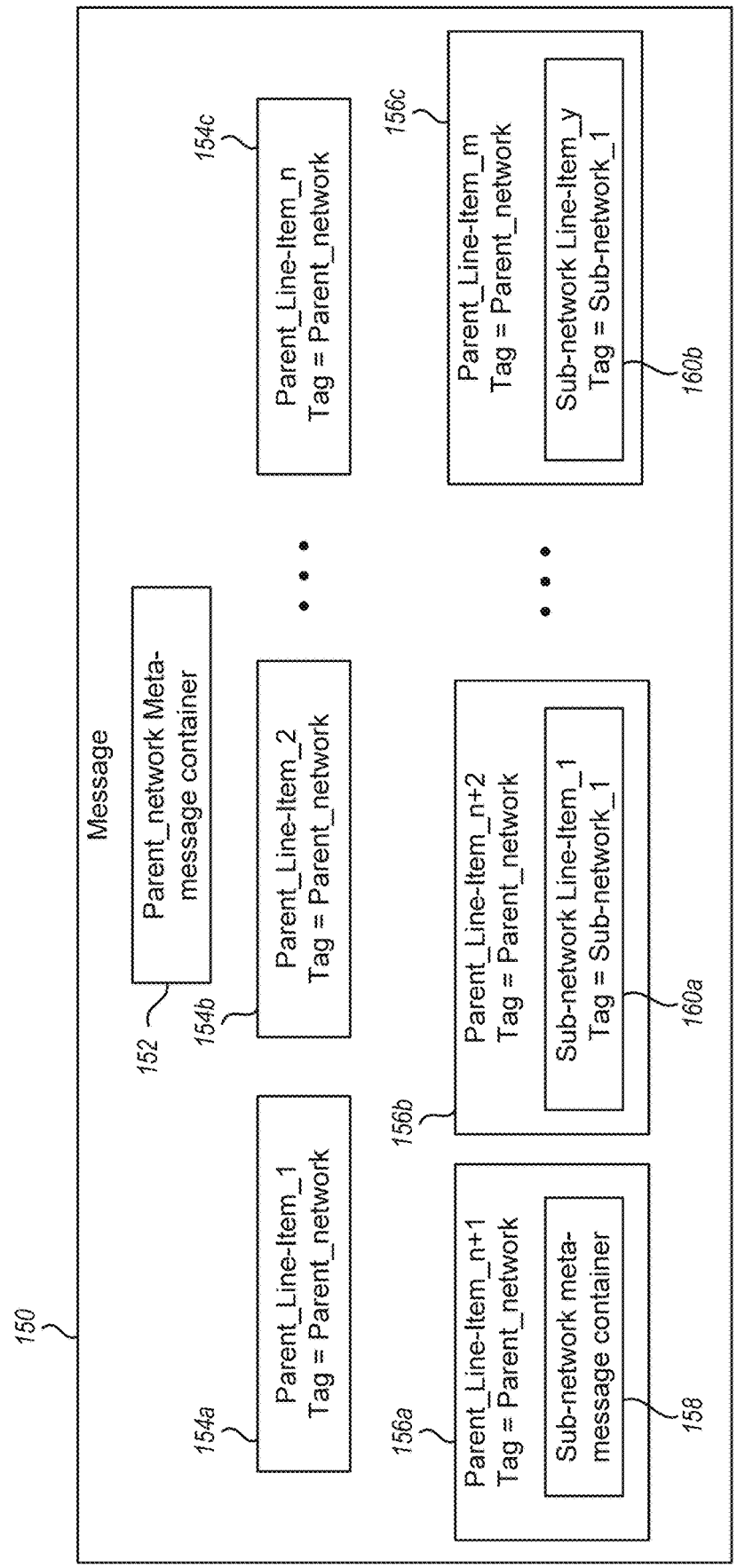

Messages can be delivered across multiple encryption hierarchies using either a peer-to-peer structure where the existence of the sub-networks is known, which is discussed in FIGS. 3C-3E, or in the parent-child relationship where the child network is completely masked and hidden, which is discussed in FIG. 3F.

Example 100C in FIG. 3C illustrates message 110 as including the meta-message container 112 and two sets or series of one or more line items, e.g., one or more line items 114a-114c and one or more line items 116a-116c. In this example, line items 114a-114c are tagged with network information "Network_1" and line items 116a-116c are tagged with network information "Network_2." Because the line items 114a-114c have a different tag from line items 116a-116c, the information in line items 114a-114c is destined for participants in a first network (e.g., "network_1") and the information in line items 116a-116c is destined for participants in a second network (e.g., "network_2"). In various embodiments, each network has different encryption parameters.

When a participant in the first network receives the message 110, it can decrypt and access the information in line items 114a-114c, but it cannot access the information in line items 116a-116c. This participant, however, can forward line items 114a-114c and line items 116a-116c to another participant even if it cannot access the information. Conversely, a participant in the second network that receives the message 110 can decrypt and access the information in line items 116a-116c, but it cannot access the information in line items 114a-114c. In this way, a transmitting participant can make information accessible to different participants in different networks or using different encryption mechanism.

In some embodiments, the participant that initially generates or originates the message may determine that the message is destined for participants in two separate domains (e.g., "network_1" and "network_2"). The originating participant may generate message 110 to include line items 114a-114c and line items 116a-116c. In this way, the two series of line items are tagged and encrypted using different encryption mechanisms for the different destination domains. When the destination participants receive message 110, they can decrypt the appropriate line items in which they maintain the appropriate decryption keys or mechanisms.

In other embodiments, the participant that initially generates or originates the message may determine that the message is destined for participants in two separate domains, but that it does not have the appropriate encryption keys or mechanism for one of the domains (e.g., "network_2"). In this case, the originating participant generates and transmits message 105 in FIG. 3B, where line item 107a indicates that the information in line items 107a-107c are also destined for participants in a different domain. When an intermediate participant receives message 105, it can determine that the message 105 includes line item 107a and should forward the message to other participants that have previously transmitted notification signals or self-reported messages that were received by the intermediate participant indicating that they are designated members of network_2 or are part of a routing graph known to the intermediate participant (which may be stored in their other data item 312 in FIG. 7). The intermediate participant can generate message 110 to include both line items 114a-114c and line items 116a-116c for the different destination domains, and then it can then forward message 110 to a next participant. In this way, information can be provided to multiple participants in different domains, in different networks, using different encryption mechanisms, or at different security levels, even if the originating participant does not have the appropriate encryption mechanism or permissions. In various embodiments, the appropriate encryption for line items 116a-116c is applied by the first subnet participant associated with the tags of line items 116a-116c that receives the information without the corresponding encryption.

Although not illustrated, in some embodiments, the message 110 may include multiple meta-message containers. Each meta-message container may include information that identifies a particular domain for the associated line items. For example, a first meta-message container may identify "network_1" and how line items 114a-114c are to be transmitted to a first destination and a second meta-message container may identify "network_2" and how line items 116a-116c are to be transmitted to a second destination. A routing manager can then utilize the identified subnets in the appropriate meta-message containers to determine a best path and next participant to get the message to the appropriate destination participant.

Example 100D in FIG. 3D is similar to example 100C in FIG. 3C and includes message 120. Message 120 includes meta-message container 122, one or more line items 124a-124c, one or more line items 126a-126c, and line item 128. Meta-message container 122, line items 124a-124c, and line items 126a-126c are similar to meta-message container 112, line items 114a-114c, and line items 116a-116c, respectively, in FIG. 2B. Therefore, the information in line items 124a-124c is accessible to participants in "network_1" and information in line items 126a-126c is accessible to participants in "network_2." As noted above, the message 120 may also include multiple meta-message containers (not illustrated) for each separate domain associated with the line items.

In this example, message 122 also includes line item 128. Line item 128 is tagged as "private_system_info" and includes system information of the transmitting participant. The line item 128 is encrypted so that additional participants can access that information. For example, line item 128 is encrypted to be accessible to participants in both "network_1" and "network_2." The participants in "network_1" may include two decryption mechanisms, one to decrypt line items 124a-124c and one to decrypt line item 128. Similarly, the participants in "network_2" may include two decryption mechanisms, one to decrypt line items 126a-126c and also the one to decrypt line item 128. Although this example indicates that system information is accessible to participants in multiple networks, other types of information or line items can be similarly tagged and encrypted.

Example 100E in FIG. 3E is similar to example 100C in FIG. 3C, but instead of including differently tagged items in the same message, example 100E illustrates two messages—message 130 and message 140, where each message includes line items that are tagged differently. For example, message 130 includes meta-message container 132 and one or more line items 134a-134c that are destined for a first domain (e.g., "network_1"). Comparatively, message 140 includes meta-message container 142 and one or more line items 144a-144c that are destined for a second domain (e.g., "network_2").

In some embodiments, because message 130 includes information destined for participants in a network different from the information in message 140, the meta-message container 132 in message 130 may include routing information that is different from the routing information in the meta-message container 142 in message 140. For example, message 130 may be routed through a first next participant, whereas message 140 may be routed through a second next participant. The second next participant may be selected as a different next participant because of bandwidth restrictions of the first next participant, fewer hops between the transmitting participant and the destination participant via the second next participant, or other routing efficiency, reliability, or safety reasons. In other embodiments, the meta-message container 130 and the meta-message container 140 may include the same routing information.

Example 100F in FIG. 3F illustrates another example message 150 that includes a meta-message container 152, one or more line items 154a-154c, and one or more line items 156a-156c. In this example, however, information to be transmitted via message 150 (e.g., notification signal system information or data signal payload information) is recursively encrypted.

First, the meta-message container 152 of the message 150 includes transmission information for a parent network, similar to what is described above. The line items 154a-154c are similar to line items 107a-107c in FIG. 3B and contain information accessible to participants of the parent network.

The message 150 may also include line items 156a-156c, which are encrypted to be accessible by participants of a particular sub-network or child network of the parent network. In this example embodiment, the line item 154a includes a meta-message container 156 that includes transmission information for the sub-network. The message information is then tagged and encrypted for the sub-network as zero or more line items 160a-160b.

In various embodiments, the information in sub-network line items 160a-160b are first tagged and encrypted for the sub-network. The sub-network meta-message container 158 and the encrypted sub-network line items 160a-160b are then tagged and encrypted for the parent network as line items 156a-156c. In this way, the top-level network only sees a single series of parent network data in line items 154a-154c and will have no visibility into either the existence or quantity of data destined for the child or sub-network in line items 156a-156c.

The operation of certain aspects will now be described with respect to FIGS. 4-6. In at least one of various embodiments, processes 200, 225, and 250 described in conjunction with FIGS. 4, 5, and 6, respectively, may be implemented by or executed on one or more computing devices, such as mobile participants 36, stationary participants 34, or network operation center server 40.

Figure 4:
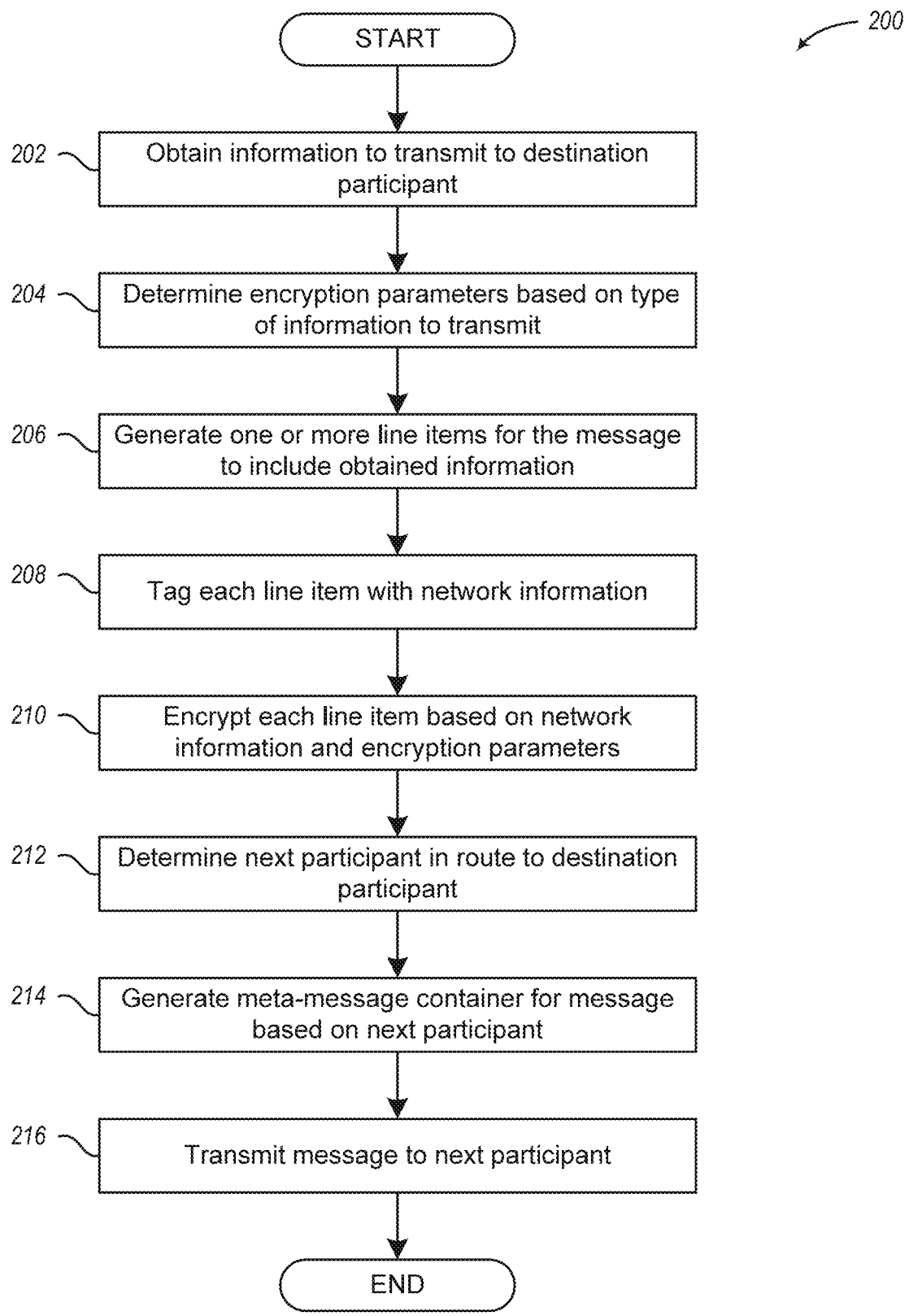
FIG. 4 illustrates a logical flow diagram showing one embodiment of a process for a computing system to generate and transmit messages utilizing multi-domain security in accordance with embodiments described herein.

FIG. 4 illustrates a logical flow diagram showing one embodiment of a process for a computing system to generate and transmit messages utilizing multi-domain security in accordance with embodiments described herein.

Process 200 begins, after a start block, at block 202, where a transmitting participant obtains information to transmit to a destination participant. In various embodiments, the information originates at or by the transmitting participant. In other embodiments, the transmitting participant obtains the information from another computing device, such as another participant or some other user computing device.

The obtained information may include system information of the transmitting participant or payload information. Examples of system information include, but are not limited to, identity of the transmitting participant, routing information, timing, kinematics of the transmitting participant, transmit and receive capabilities of the transmitting participant, power source and level for message transmission, etc. Examples of payload information may include, but are not limited to, a request for data, voice or video data, telemetry data, safety data, security information, or other types of data or information that may be transmitted from one participant to another participant.

Process 200 proceeds to block 204, where one or more encryption parameters are determined based on a type of the information obtained at block 202. The encryption parameters identify a security level of the information, the domain that is to be able to access the information, a specific encryption mechanism, etc.

Process 200 continues at block 206, where one or more line items are generated for the message to include the obtained information. The one or more line items are groupings or clusters of the obtained information that are to be tagged and encrypted prior to transmission.

Process 200 proceeds next to block 208, where each line item is tagged with network information. The tag or network information for each line item indicates which participants of which domain are authorized to access the information in that line item, which may be selected based on the encryption parameters determined at block 204. In some embodiments, the network information may include a highest parent domain, a sub-domain, or some other domain (e.g., an isolated or private subnet). The network information may include a network identifier, a participant identifier, a classification level (e.g., unclassified, secret, top-secret), an encryption identifier, or other information that can be used by another participant to determine if that participant can decrypt and access that corresponding line item. In some embodiments, each separate line item is tagged with corresponding network information. In other embodiments, a plurality of line items may be grouped together and tagged with a group or common network information.

Process 200 continues next at block 210, where each line item is encrypted based on the network information and the encryption parameters. In various embodiments, the network information or the encryption parameters, or both, are utilized to select an appropriate network key or other encryption information necessary to encrypt the corresponding line item. In some embodiments, one or more first line items are encrypted via a first encryption mechanism for participants of a first domain or network and one or more second line items are encrypted via a second encryption mechanism for participants of a second domain or network.

Process 200 proceeds to block 212, where a next participant in route to the destination participant is determined. In various embodiments, the transmitting participant maintains a routing table, routing information, or other data structure indicating which participants are available to the transmitting participant as the next participant. For example, the routing table may list all participants that are in line-of-sight communication of the transmitting participant and their respective positions. The transmitting participant can then determine the next participant based on this list.

In some embodiments, the next participant may be selected based on the network information tagged to the line items. For example, the next participant may be selected to be in the same domain as the participants that can access the line items, even if the next participant is not the destination participant. Other types of routing techniques may also be used to select the next participant.

Process 200 continues at block 214, where a meta-message container is generated for the message based on the next participant. In various embodiments, the meta-message container includes enough information to facilitate the transmission of the message to the next participant. The meta-message container may also include other transmission verification information, such as a message length, error detecting checksum, etc. In at least one embodiment, the meta-message container is not encrypted. In other embodiments, the meta-message container may be encrypted at a very high network level such that all participants—no matter the security level of the payload or the participant—can decrypt and read the contents of the meta-message container. In some embodiments, the meta-message container may be signed to provide transmission correctness.

Process 200 proceeds next to block 216, where the message is transmitted to the next participant. In various embodiments, the message is transmitted to the next participant via a directional transmission, as discussed above.

Figure 5:
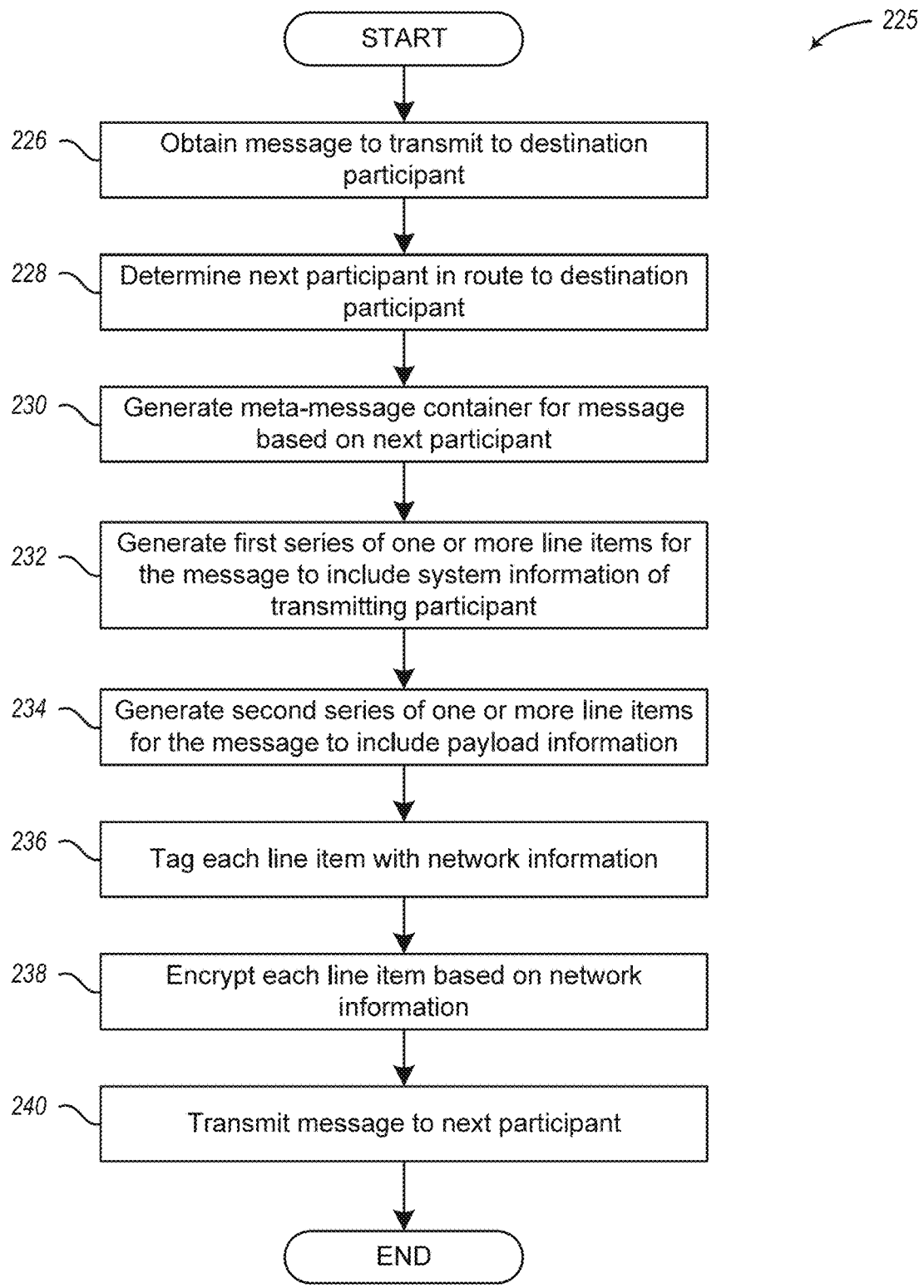
FIG. 5 illustrates a logical flow diagram showing another embodiment of a process for a computing system to generate and transmit messages utilizing multi-domain security in accordance with embodiments described herein.

FIG. 5 illustrates a logical flow diagram showing another embodiment of a process 225 for a computing system to generate and transmit messages utilizing multi-domain security in accordance with embodiments described herein.

Process 225 begins, after a start block, at block 226, where a transmitting participant obtains a message to transmit to a destination participant. In general, a message includes a meta-message container and zero or more line items. Each line item includes information that is tagged and encrypted to be accessible to specific participants or participants of specific networks. In some embodiments, each line item may be referred to as a sub-message.

In some embodiments, the transmitting participant generates the message to transmit based on information originating at the transmitting participant, such as a data transmission associated with a user request or a notification signal to self-report the transmitting participant's kinematic information or to track other participants, as described herein. In other embodiments, the message is obtained from another participant and the transmitting participant is forwarding the message to another participant towards the destination participant.

Process 225 proceeds to block 228, where a next participant is determined for the message in route to the destination participant. In various embodiments, the transmitting participant maintains a routing table, routing information, or other data structure indicating which participants are available to the transmitting participant as the next participant, which may be similar to block 212 in FIG. 4. For example, the routing table may list all participants that are in line-of-sight communication of the transmitting participant and their respective positions. The transmitting participant can then determine the next participant based on this list.

Process 225 continues at block 230, where a meta-message container is generated for the message based on the next participant. In various embodiments, block 230 may employ embodiments of block 214 in FIG. 4 to generate the meta-message container to facilitate the transmission of the message to the next participant.

Process 225 proceeds next to block 232, where a first series of line items are generated for the message. The first series of line items include system information of the transmitting participant. Examples of system information include, but are not limited to, identity of the transmitting participant, routing information, timing, kinematics of the transmitting participant, transmit and receive capabilities of the transmitting participant, power source and level for message transmission, etc. Although the term "series" is utilized to describe the line items, it should not be interpreted as requiring multiple line items. Rather, in some embodiments, only a single line item is generated for the message. Moreover, there may be one or more additional series of one or more line items that include system information. Each line item or series of multiple line items may be tagged, as discussed in more detail below, with the same or different network information.

As indicated above, the message may be received from a previous participant and forwarded to the next participant in route to the destination participant. In at least one such embodiment, the system information of the previous participant in the received message may be removed and replaced with the system information of the now transmitting (i.e., forwarding) participant. In other embodiments, the system information of the transmitting participant may be added to or augmented with the system information of the previous participant.

Process 225 continues next at block 234, where a second series of line items are generated for the message. The second series of line items include payload information of the message. The payload information may include data accessible to one or more participants. Examples of payload information may include, but are not limited to, a request for data, voice or video data, telemetry data, safety data, security information, or other types of data or information that may be transmitted from one participant to another participant.

As indicated above, some messages may be notification signals without data. These notification signals may be messages that include the first series of line items, but not the second series of line items. In at least one such embodiment, block 234 may be optional and may not be performed. Moreover, in some embodiments, there may be one or more additional series of one or more line items that include payload information. Each line item or series of multiple line items may be tagged, as discussed in more detail below, with the same or different network information.

Although blocks 232 and 234 discuss the generation of a first series and a second series of line items, embodiments are not so limited. In some embodiments, only a single series of zero or more line items may be generated for the message. In other embodiments, a plurality of series of zero or more line items may be generated for the message. Additionally, the number of series of line items or the number of line items in a series may vary from one message to another depending on one or more participant or network criteria. Such criteria may include, but is not limited to, a participant's available power, processing power, bandwidth, ranged antenna capabilities, power output, radio accuracy, update rate, network congestion, number of nearby participants, or other performance, efficiency, safety, or environmental criteria.

Process 225 proceeds to block 236, where each line item is tagged with network information. The tag or network information for each line item indicates which participants of which domain are authorized to access the information in that line item. This tagging may be referred to as flagging the line item with metadata to mark the corresponding line item's level of releasability or classification. The network information may include a network identifier, a participant identifier, a classification level (e.g., unclassified, secret, top-secret), an encryption identifier, or other information that can be used by another participant to determine if that participant can decrypt and access that corresponding line item.

In some embodiments, each separate line item is tagged with corresponding network information. In other embodiments, a plurality of line items may be grouped together and tagged with a group or common network information.

Process 225 continues at block 238, where each line item is encrypted based on the network information. In various embodiments, the network information is utilized to select an appropriate network key or other encryption information necessary to encrypt the corresponding line item. In some embodiments, one or more first line items are encrypted via a first encryption mechanism for participants of a first domain or network and one or more second line items are encrypted via a second encryption mechanism for participants of a second domain or network. In other embodiments, the payload information may include recursively encrypted payloads such that line items are encrypted multiple times based on parent and child network encryption requirements. Utilization of multiple encryption mechanisms is discussed in more detail below in conjunction with FIG. 6.

If the transmitting participant is forwarding a message from a previous participant, some line items, such as payload line items, may already be encrypted. In fact, the transmitting participant may not have the appropriate authorization or information to decrypt one or more line items. In some embodiments, the tag is not encrypted. The transmitting participant can assess the tags to select the next participants or participants to transmit to based on who is associated to those subnet tags and form the message container appropriately.

Process 225 proceeds next to block 240, where the message is transmitted to the next participant. In various embodiments, the message is transmitted to the next participant via a directional transmission, as discussed above.

Figure 6:
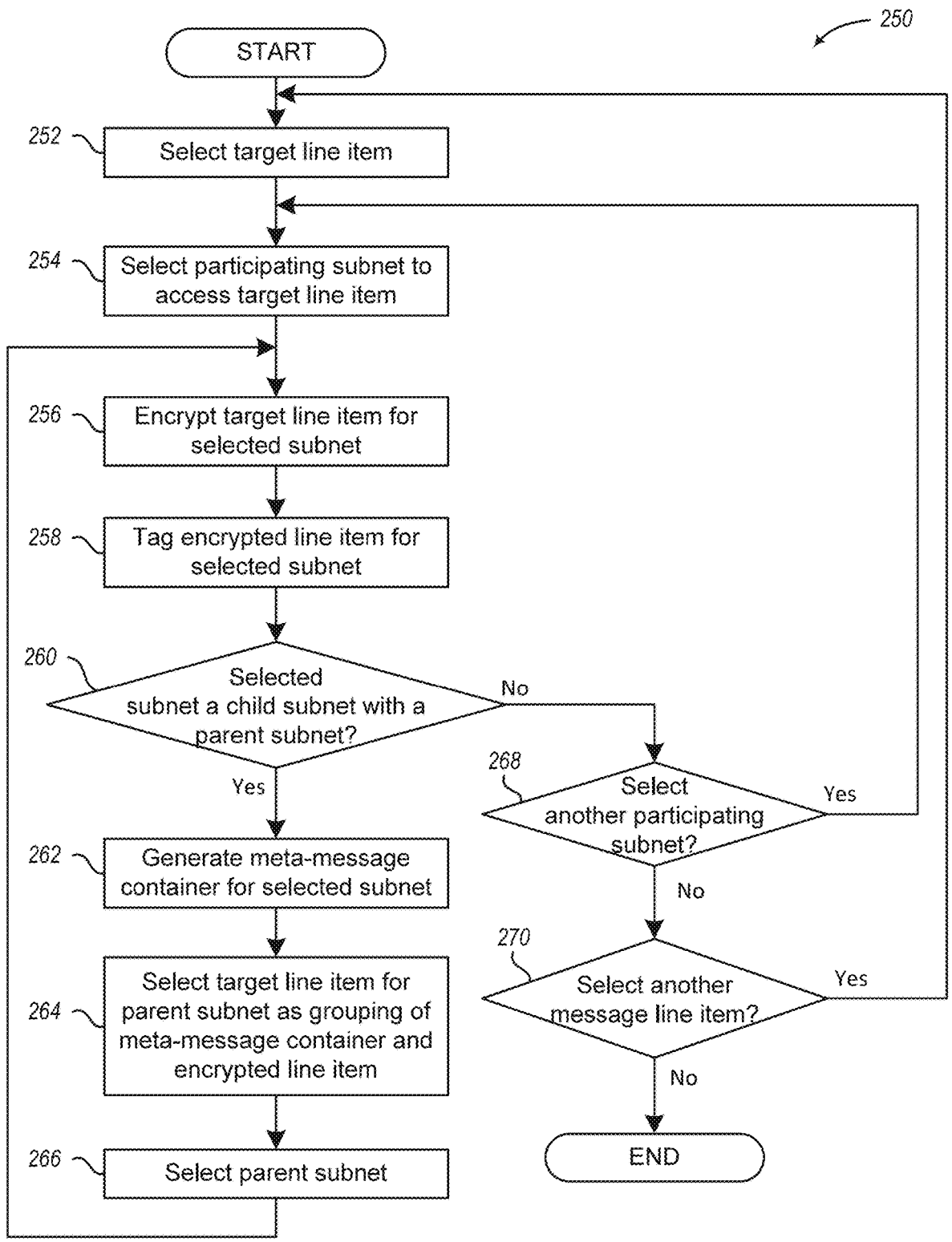
FIG. 6 illustrates a logical flow diagram showing one embodiment of a process for a computing system to employing recursive security to provide multi-domain security in accordance with embodiments described herein.

FIG. 6 illustrates a logical flow diagram showing one embodiment of a process 250 for a computing system to employing recursive security to provide multi-domain security in accordance with embodiments described herein.

Process 250 begins, after a start block, at block 252, where a target line item for a message is selected. The target line item may be system information or payload information.

Process 250 proceeds to block 254, where a participating subnet in the network is selected for the target line item. The selected participating subnet may be a subnet where participants can access the target line item. In some embodiments, the selected participating subnet is selected based on network information associated with the target line item. In other embodiments, the participating subnet may be selected based on the subnet being along the route from the transmitting participant to the destination participant. Although embodiments are generally discussed with respect to networks, other domains and sub-domains may also be utilized, e.g., different employment mechanisms, different jurisdictions, classifications, security levels, etc.

Process 250 continues to block 256, where the target line item is encrypted for the selected subnet. In various embodiments, network information associated with the selected subnet is utilized to select an appropriate network key or other encryption information necessary to encrypt the target line item.

Process 250 proceeds next to block 258, where the encrypted line item is tagged with the network information for the selected subnet. In various embodiments, block 260 may employ embodiments of block 236 to tag the encrypted line item.

Process 250 continues next at decision block 260, where a determination is made whether the selected subnet is a child subnet with a parent subnet. In some embodiments, a table, database, or other data structure may store information indicating which participating subnets are child subnets of parent subnets. In other embodiments, the network information associated with the target line item may indicate if the selected subnet is a child subnet with a parent subnet. If the selected subnet is a child subnet with a parent subnet, then process 250 flows to block 262, otherwise, process 250 flows to decision block 268.

At block 262, a meta-message container is generated for the selected subnet. Similar to block 230 in FIG. 5, the meta-message container includes enough information to facilitate the transmission of the message to a next participant in the selected subnet. The meta-message container may also include other transmission verification information, such as a message length, error detection checksum, etc.

Process 250 proceeds to block 264, where a current target line item is now selected for the parent subnet of the selected child subnet. This selected target line item is the grouping or combination of the meta-message container generated at block 262 and the tagged encrypted line item from block 258. By grouping the meta-message container and the tagged and encrypted line item, a parent subnet's encryption can be employed in a recursive manner.

Process 250 continues at block 266, where a parent subnet is selected. This selected parent subnet is the parent subnet of the previously selected child subnet. In various embodiments, the parent subnet may be selected based on network information associated with the current target line item or the original target line item. In other embodiments, the parent subnet may be selected based on the parent/child relationship of subnets being utilized along the route from the transmitting participant to the destination participant. In at least one embodiment, information obtained at decision block 260 to determine if the previously selected subnet is a child subnet may be used to determine and selected the parent subnet.

In some embodiments, multiple subnets may be set up such that compatible encryption is used to share and not isolate certain data. For example, if subnet_1 and subnet_2 both have data that needs to be encrypted by encryption_mechanism_X, then, in one embodiment, encryption_mechanism_X.1 and encryption_mechanism_X.2 can be used to encrypt the data for subnet_1 and subnet_2, respectively. The parent subnet may be utilized to help pass the information along to the appropriate subnet. The parent subnet may or may not be able to decrypt the data. In another embodiment, encryption_mechanism_X may be used to share the information across both subnets without having to go up a layer to the parent subnet. In other embodiments, multiple subnets may use encryption_mechanism_X.1, while other subnets use encryption_mechanism_X.2 to limit the sharing of information across selected subnets without having to go up to the parent subnet to flow information across.

After block 266, process 250 loops to block 256, where the current target line item (e.g., the combined meta-message container and the tagged encrypted line item for the child subnet) is encrypted and then tagged at block 258. At decision block 260, a determination is then made whether the selected parent subnet is also a child subnet with a parent subnet. This looping allows for the recursive or nesting of multiple layers or levels of security to protect the information in the original message line item.

If, at decision block 260, the selected subnet is not a child subnet, process 250 flows from decision block 260 to decision block 268.

At decision block 268, a determination is made whether to select another participating subnet. In some embodiments, the information from the target line item from the message may be encrypted such that multiple different participating subnets or participants in different subnets or domains can decrypt the line item. In some embodiments, this determination may be made based on the network information, metadata associated with the message, the route of the message, the destination of the message, etc. If another participating subnet is to be selected, process 250 loops to block 254 to select another participating subnet; otherwise, process 250 flows to decision block 270.

By looping to block 254 to select another participating subnet to access the information in the target line item, the message can include multiple copies of the line item, but encrypted to be accessed by participants in different subnets with different security levels or encryption mechanisms. In some embodiments, a new message may be generated for the other participating subnet, and process 225 in FIG. 5 or process 250 in FIG. 6 may be employed for the copied message using the other selected subnet.

At decision block 270, a determination is made whether another message line item is selected. In some embodiments, a message may include multiple line items that each need to be encrypted based on the participating subnets or the participant's security levels, including multiple layers or levels of security. If another message line item is selected, process 250 loops to block 252 to select another target line item from the message; otherwise, process 250 terminates or otherwise returns to a calling process to perform other actions.

Figure 7:
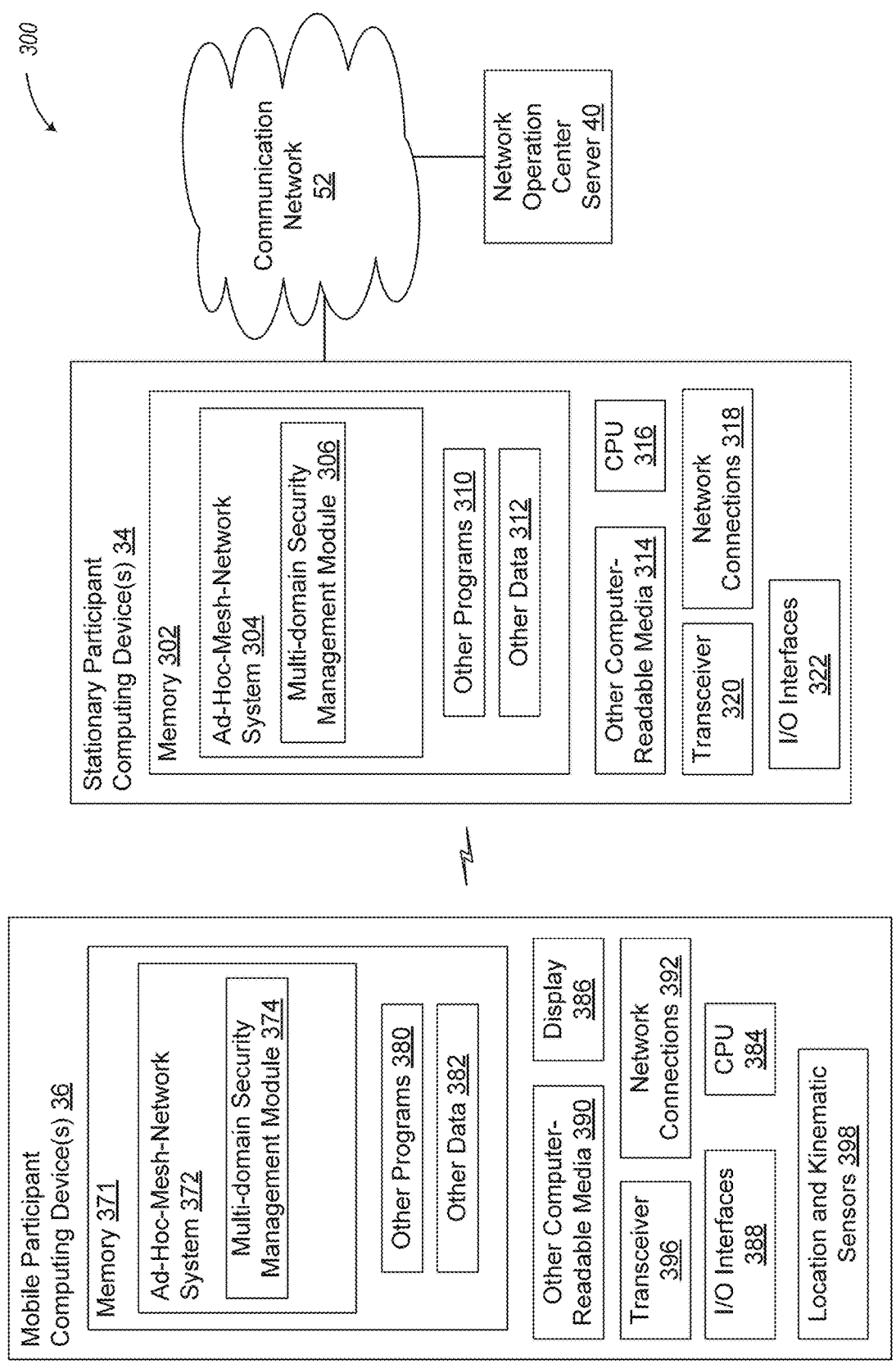
FIG. 7 shows a system diagram that describes one implementation of computing systems for implementing embodiments described herein.

FIG. 7 shows a system diagram that describes one implementation of computing systems for implementing embodiments described herein. System 300 includes mobile participant computing device(s) 36 (e.g., aerial mobile devices), stationary participant computing device(s) 34, and network operation center server 40.

Mobile participant computing device(s) 36 communicate with one or more other mobile participant computing devices 36 and stationary participant computing devices 34 via line-of-sight communications to transmit data and other communications among the participants using multi-domain encryption described herein. One or more special-purpose computing systems may be used to implement each mobile participant computing device 36. Accordingly, various embodiments described herein may be implemented in software, hardware, firmware, or in some combination thereof. A mobile participant computing device 36 may include memory 371, one or more central processing units (CPUs) 384, display 386, other I/O interfaces 388, other computer-readable media 390, network connections 392, transceiver 396, and location and kinematic sensors 398.

Memory 371 may include one or more various types of non-volatile and/or volatile storage technologies. Examples of memory 371 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 371 may be utilized to store information, including computer-readable instructions that are utilized by CPU 384 to perform actions, including embodiments described herein.

Memory 371 may have stored thereon ad-hoc-mesh-network system 372, which includes multi-domain security management module 374. The multi-domain security management module 374 may employ embodiments described herein to employ multi-domain security and encryption to transmit data and track objects. The memory 371 may also store other programs 380 and other data 382. The other programs 380 may include user applications, other tracking or geo-positioning programs, etc. The other data 382 may include domain information, participant and sensor information, data or information regarding one or more non-participant objects, or other information.

Network connections 392 are configured to communicate with other computing devices, such as other mobile participant computing devices 36 and stationary participant computing devices 34 via transceiver 396 and line-of-sight communications mechanisms and technologies. Transceiver 396 may be an omni-directional transceiver that sends and receives radio signals independent of direction, or transceiver 396 may be a directional transceiver that sends or receives, or both sends and receives, radio signals to or from a particular direction relative to the positioning of the mobile participant computing device 36.

Location and kinematic sensors 398 include one or more sensors that are used to determine the position of the mobile participant computing device 36 and the kinematic information of how the mobile participant computing device 36 is moving. Examples of location and kinematic data sensors 398 include, but are not limited to using participant's self-reported notifications calibrated off of stationary participants, processing the echo of participant's own self-reported notifications, GPS modules, accelerometers, gyroscopes, or other sensors that can be used to determine the position and kinematic information of the mobile participant computing device 36.

Other I/O interfaces 388 may include a keyboard, audio interfaces, video interfaces, or the like. Other computer-readable media 390 may include other types of stationary or removable computer-readable media, such as removable flash drives, external hard drives, or the like. Display 386 is a display interface that is configured to output images, content, or information to a user. Examples of display 386 include, but are not limited to, LCD screens, LEDs or other lights, or other types of display devices.

Stationary participant computing device(s) 34 communicate with mobile participant computing devices 36 via line-of-sight communications and with other stationary participants either by wired or wireless communications to transmit information or data to other participants or to non-participants. One or more special-purpose computing systems may be used to implement each stationary participant computing device 34. Accordingly, various embodiments described herein may be implemented in software, hardware, firmware, or in some combination thereof. A stationary participant computing device 34 may include memory 302, one or more central processing units (CPUs) 316, I/O interfaces 322, other computer-readable media 314, network connections 318, and transceiver 320.

Memory 302 may include one or more various types of non-volatile and/or volatile storage technologies. Examples of memory 302 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 302 may be utilized to store information, including computer-readable instructions that are utilized by CPU 316 to perform actions, including embodiments described herein.

Memory 302 may have stored thereon ad-hoc-mesh-network system 304, which includes multi-domain security management module 306. The multi-domain security management module 306 may employ embodiments described herein to employ multi-domain security to communication with other participants or to track objects. In various embodiments, multi-domain security management module 306 may communicate with network operation center server 40 via communication network 52.

The memory 302 may also store other programs 310 and other data 312. The other data 312 may include participant data or information, data or information regarding one or more tracked objects, or other information.

Network connections 318 are configured to communicate with other computing devices, such as other stationary participant computing devices 34 and mobile participant computing devices 36 via transceiver 320 and wired or line-of-sight communications mechanisms and technologies. Network connections 318 are also configured to communicate with the network operation center server 40 via communication network 52.

Transceiver 320 may be a omni-directional transceiver that sends and receives radio signals independent of direction, or transceiver 320 may be a directional transceiver that sends or receives, or both sends and receives, radio signals to or from a particular direction relative to the position of the stationary participant computing device 34.

Other I/O interfaces 322 may include a keyboard, audio interfaces, video interfaces, or the like. Other computer-readable media 314 may include other types of stationary or removable computer-readable media, such as removable flash drives, external hard drives, or the like.

Network operation center server 40 includes one or more computing devices that store information about the positioning of mobile participant computing devices 36 and stationary participant computing devices 34, such as a master participant table. The network operation center server 40 may also store information regarding the sensor capabilities of each participant, as described herein. The network operation center server 40 also includes memory, one or more processors, network interfaces and connections, and other computing components similar to mobile participant computing devices 36 and stationary participant computing devices 34, but those components are not shown here for ease of illustration.

Communication network 52 may include one or more wired or wireless communication networks to transmit data between one stationary participant computing device 34 and another stationary participant computing device 34 or with the network operation center server 40.

The various embodiments described above can be combined to provide further embodiments. These and other changes can be made to the embodiments in light of the above-detailed description. Moreover, additional details and use case examples are provided in the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 15/892,259, filed Feb. 8, 2018 (issued as U.S. Pat. No. 10,178,509 on Jan. 8, 2019), entitled "Object Tracking Using A Cognitive Heterogeneous Ad Hoc Mesh Network;" Provisional Patent Application No. 62/467,572, filed Mar. 6, 2017, entitled "Scatternet: A cognitive heterogeneous ad hoc mesh data/cellular/Wi-Fi network establishment/access points/connected devices through utilization of software applications exploiting existing technologies and frequency spectrum for data and voice communications through the exploitation of the Internet and Internet of Things, resulting in the creation of Data communications Adaptive RADAR (DATAR);" and U.S. patent application Ser. No. 15/913,612, filed Mar. 6, 2018 (issued as U.S. Pat. No. 10,419,103 on Sep. 17, 2019), entitled "Cognitive Heterogeneous Ad Hoc Mesh Network;" which are incorporated herein by reference, in their entirety.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
obtaining, by a transmitting participant, a message to be transmitted to a destination participant that is a member of a child network having a parent network, wherein the child network has first encryption parameters and the parent network has second encryption parameters;
generating a first meta-message container for the message at the parent network based on a next participant in a route from the transmitting participant to the destination participant;
generating a second meta-message container for the message at the child network;
generating one or more first line items that include system information of the transmitting participant;
tagging each of the one or more first line items with network information;
encrypting each of the one or more first line items based on the first encryption parameters;
generating one or more second line items that include the second meta-message container and the one or more encrypted first line items;
encrypting each of the one or more second line items based on the second encryption parameters; and
transmitting, by the transmitting participant, the first meta-message container and the one or more encrypted second line items to the next participant.

2. The method of claim 1, wherein generating the one or more second line items comprises:
generating the one or more second line items to include payload information of the message;

tagging each of the one or more second line items with the network information.

3. The method of claim 1, wherein generating and encrypting the one or more first line items comprises:
generating a first line item and a second line item that both include kinematic and positional information of the transmitting participant;
encrypting the first line item based on first child encryption parameters for a first child network; and
encrypting the second line item based on second child encryption parameters for a second child network.

4. The method of claim 1, further comprising:
generating one or more other line items for the message at another network; and
encrypting each of the one or more other line items based on third encryption parameters for the other network.

5. The method of claim 1, further comprising:
signing the meta-message container using a global network key for transmission authenticity and correctness.

6. The method of claim 1, further comprising:
receiving, at the transmitting participant and from another participant, a request to access the child network, the request including the second encryption parameters for the parent network; and
sending, from the transmitting participant to the other participant, the first encryption parameters for the child network.

7. The method of claim 1, further comprising:
storing a global key on the transmitting participant, the global key being for a unified network;
receiving, at the transmitting participant and from another participant, a request to access a second network associated with the transmitting participant, the request including the global key;
sending, from the transmitting participant to the other participant, a pair-wise additional key for the second network; and
encrypting the one or more line items based on the global key and the pair-wise additional key.

8. The method of claim 1, further comprising:
storing a global key on the transmitting participant, the global key being for a unified network;
sending, by the transmitting participant and to another participant of the unified network, a request for the other participant to join a private network with the transmitting participant, the request including the global key; and
receiving a private key for the private network from the other participant.

9. A non-transitory processor readable storage medium having stored thereon instructions that, when executed by a processor, cause the processor to perform actions comprising:
obtaining, by a transmitting participant, a message to be transmitted to a destination participant that is a member of a child network of a parent network, wherein the child network has first encryption parameters and the parent network has second encryption parameters;
generating a first meta-message container for the message at the parent network based on a next participant in a route from the transmitting participant to the destination participant;
generating a second meta-message container for the message at the child network;
generating a first series of one or more line items that include system information of the transmitting participant;
encrypting each of the first series of one or more line items based on the first encryption parameters;
generating a second series of line items that include the second meta-message container and the first series of one or more encrypted line items;
encrypting the second series of line items based on the second encryption parameters; and
transmitting, by the transmitting participant, the first meta-message container and the second series of encrypted line items to the next participant.

10. The non-transitory processor readable storage medium of claim 9, wherein the instructions, when executed by the processor to generate the second series of one or more line items, further cause the processor to perform additional actions comprising:
generating the second series of one or more line items to include payload information of the message.

11. The non-transitory processor readable storage medium of claim 9, wherein the instructions, when executed by the processor to generate and encrypt the first series of one or more line items, further cause the processor to perform additional actions comprising:
generating a first line item and a second line item that both include kinematic and positional information of the transmitting participant;
encrypting the first line item based on first child encryption parameters for a first child network; and
encrypting the second line item based on second child encryption parameters for a second child network of the parent network.

12. The non-transitory processor readable storage medium of claim 9, wherein the instructions, when executed by the processor, further cause the processor to perform additional actions comprising:
generating one or more other line items for the message at another network;
encrypting each of the one or more other line items based on third encryption parameters for the other network.

13. The non-transitory processor readable storage medium of claim 9, wherein the instructions, when executed by the processor, further cause the processor to perform additional actions comprising:
receiving, at the transmitting participant and from another participant, a request to access the child network, the request including the second encryption parameters for the parent network; and
sending, from the transmitting participant to the other participant, the first encryption parameters for the child network.

14. A computing device, comprising:
a transceiver configured to send and receive messages;
a memory that stores computer instructions;
a processor that executes the computer instructions to:
obtain a message to be transmitted from a transmitting participant to a destination participant that is a member of a child network of a parent network, wherein the child network has first encryption parameters and the parent network has second encryption parameters;
generate a first meta-message container for the message at the parent network based on a next participant in a route from the transmitting participant to the destination participant;
generate a second meta-message container for the message at the child network;

generate a first series of one or more line items that include system information of the transmitting participant;

encrypt each of the first series of one or more line items based on the first encryption parameters;

generate a second series of line items that include the second meta-message container and the first series of one or more encrypted line items;

encrypt the second series of line items based on the second encryption parameters; and transmit the first meta-message container and the second series of encrypted line items from the transmitting participant to the next participant.

15. The computing device of claim 14, wherein the processor generates the second series of one or more line items by executing further computer instructions to:

generate the second series of one or more line items to include payload information of the message.

16. The computing device of claim 14, wherein the processor generates and encrypts the first series of one or more line items by executing further computer instructions to:

generate a first line item and a second line item that both include kinematic and positional information of the transmitting participant;

encrypt the first line item based on first child encryption parameters for a first child network; and encrypt the second line item based on second child encryption parameters for a second child network of the parent network.

17. The computing device of claim 14, wherein the processor executes further computer instructions to:

generate one or more other line items for the message at another network;

encrypt each of the one or more other line items based on third encryption parameters for the other network.

18. The computing device of claim 14, wherein the processor executes further computer instructions to:

receive, from another participant, a request to access the child network, the request including the second encryption parameters for the parent network; and send the first encryption parameters for the child network to the other participant.

* * * * *